United States Patent
Ohwaki et al.

(10) Patent No.: US 7,936,950 B2
(45) Date of Patent: May 3, 2011

(54) APPARATUS FOR CREATING INTERPOLATION FRAME

(75) Inventors: Kazuyasu Ohwaki, Kanagawa (JP); Goh Itoh, Tokyo (JP); Nao Mishima, Tokyo (JP); Yasutoyo Takeyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1115 days.

(21) Appl. No.: 11/674,503

(22) Filed: Feb. 13, 2007

(65) Prior Publication Data
US 2007/0230830 A1    Oct. 4, 2007

(30) Foreign Application Priority Data
Mar. 30, 2006  (JP) .................. 2006-095941

(51) Int. Cl.
*G06K 9/32* (2006.01)
(52) U.S. Cl. .................. 382/300; 345/475
(58) Field of Classification Search .......... 345/475, 345/606; 348/E7.012; 375/E7.25, E7.211; 382/300; 386/50, 73; 700/252; 702/169; 704/E19.014, 265; 708/290, 313, 847
See application file for complete search history.

(56) References Cited

U.S. PATENT DOCUMENTS

| 5,400,076 | A  | * | 3/1995 | Iwamura | .......... 375/240.15 |
| 7,561,621 | B2 | * | 7/2009 | Itoh et al. | .......... 375/240.16 |
| 2003/0174777 | A1 | | 9/2003 | Itoh et al. | |
| 2004/0046891 | A1 | | 3/2004 | Mishima et al. | |
| 2004/0101058 | A1 | * | 5/2004 | Sasai et al. | .......... 375/240.26 |
| 2004/0240551 | A1 | | 12/2004 | Itoh et al. | |
| 2004/0246374 | A1 | | 12/2004 | Mishima et al. | |
| 2004/0247028 | A1 | * | 12/2004 | Kim | .......... 375/240.16 |
| 2005/0053291 | A1 | | 3/2005 | Mishima et al. | |
| 2005/0100095 | A1 | | 5/2005 | Itoh et al. | |
| 2005/0157792 | A1 | | 7/2005 | Baba et al. | |
| 2005/0207496 | A1 | * | 9/2005 | Komiya et al. | .......... 375/240.16 |
| 2006/0222077 | A1 | * | 10/2006 | Ohwaki et al. | .......... 375/240.16 |

FOREIGN PATENT DOCUMENTS

| EP | 0 883 298 A2 | 12/1998 |
| JP | 11-177940 | 7/1999 |
| JP | 2004-104656 | 4/2004 |
| JP | 2004-357215 | 12/2004 |
| JP | 2005204066 | 7/2005 |
| JP | 2005-286507 | 10/2005 |
| JP | 2006-311480 | 11/2006 |

OTHER PUBLICATIONS

Japanese Office Action for JP2006-095941 mailed on Aug. 18, 2009.

* cited by examiner

*Primary Examiner* — Gregory F Cunningham
(74) *Attorney, Agent, or Firm* — Turocy & Watson, LLP

(57) ABSTRACT

An area detecting unit detects a first matching area in a first reference block in the first reference frame, a second matching area in a second reference block in the second reference frame. A settling unit settles a secondary motion vector to be assigned to a mismatching area in the each interpolation block, based on surrounding interpolation blocks around the mismatching area. A motion compensating unit assigns an image to the interpolation frame based on the primary motion vector and the secondary motion vector.

8 Claims, 35 Drawing Sheets

INTERPOLATION FRAME

INTERPOLATION FRAME

FIG.13
FIRST REFERENCE FRAME
200
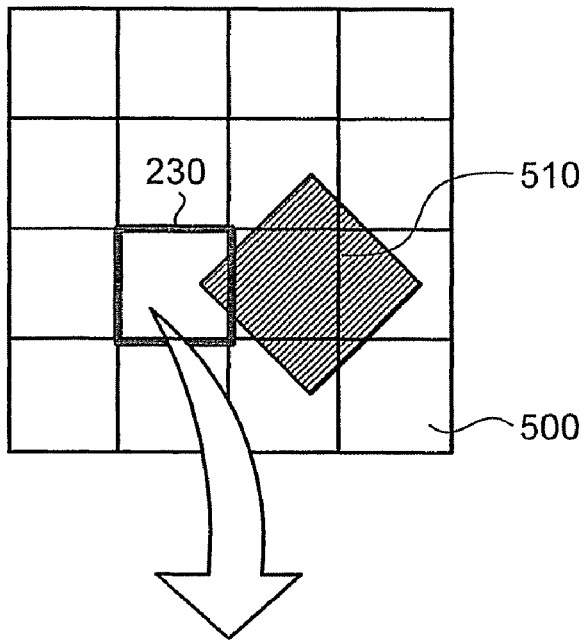
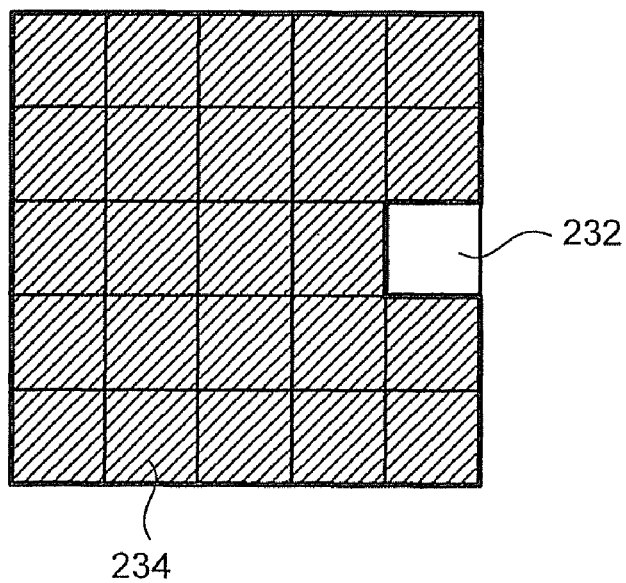

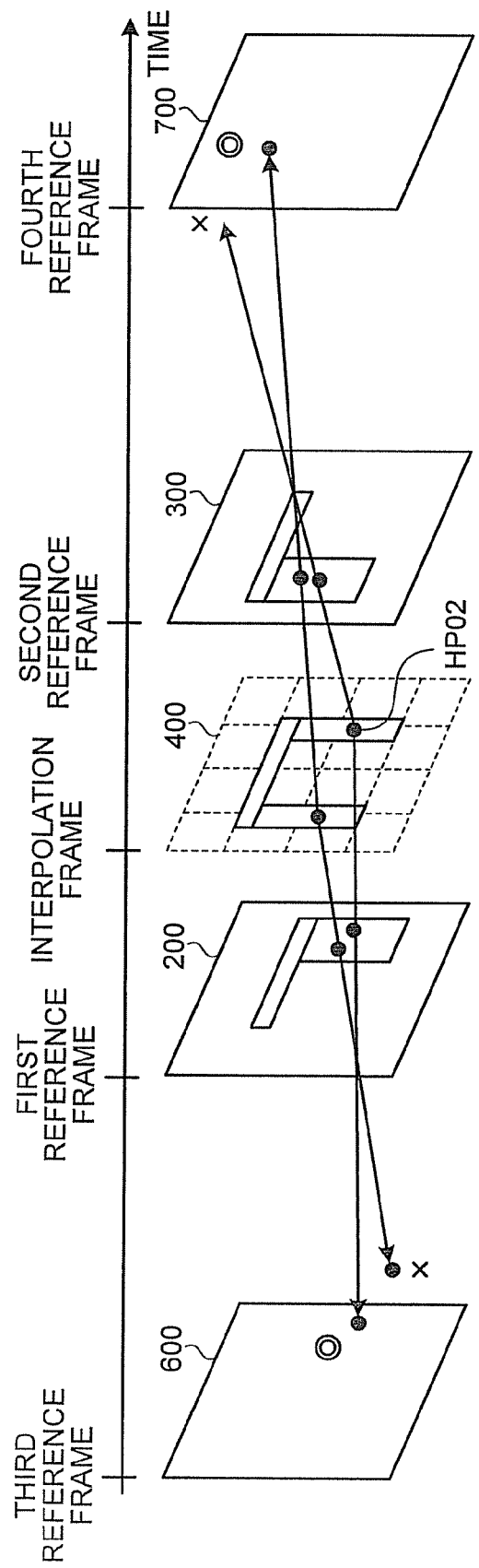

APPARATUS FOR CREATING INTERPOLATION FRAME

CROSS-REFERENCE TO RELATED APPLICATIONS

This application is based upon and claims the benefit of priority from the prior Japanese Patent Application No. 2006-95941, filed on Mar. 30, 2006; the entire contents of which are incorporated herein by reference.

BACKGROUND OF THE INVENTION

1. Field of the Invention

The present invention relates to a technology for creating an interpolation frame between reference frames.

2. Description of the Related Art

In general, there are two types of display devices, namely, an impulse-type display device and a hold-type display device. The impulse-type display device emits light only for a certain persistence period of phosphor after writing an image onto a screen of the display device. A cathode ray tube (CRT) display and a field emission display (FED) are categorized as the impulse system, for example. The hold-type display device holds display of a last image frame until a new image frame is written. A liquid crystal display (LCD) and an electro-luminescence display (ELD) are categorized as the hold type, for example.

One of drawbacks of the hold-type display device is a blur event that occurs while displaying a moving image. The blur event occurs because images of a plurality of frames are superposed and reflected in eyes when a moving object appears in the images across the frames and the eyes of an observer follow the movement of the moving object.

Despite that the same image of the previous frame is kept being displayed until the previous frame of the displayed image is replaced with the next frame, the eyes observe the moving object by moving their sight to the moving direction of the moving object on the previous frame while predicting display of the next frame of the image. In other words, following movement of the eyes is continuous, and the eyes perform sampling of the image at intervals shorter than an inter-frame spacing of the moving image. As a result, the eyes visually recognize an image between two successive frames to compensate the spacing, thereby observing the blur event.

The problem can be solved by setting a shorter inter-frame spacing for displaying. This can also improve unnatural motion in a moving image with a few display frames. One of conceivable concrete approaches is to create an interpolation image by using motion compensation, which is used for an MPEG2, to interpolate between successive frames.

The motion compensation uses a motion vector detected by block matching. However, MPEG2 creates an image block by block, so that if a block includes a plurality of objects that moves differently, correlated part and uncorrelated part arise within the block, thereby resulting in block distortion due to the uncorrelated part.

JP-A 2004-104656 (KOKAI) discloses a method of interpolation frames for solving these problems. A block is divided into a plurality of areas, and a motion vector is obtained per each area. This can reduce block distortion in a block that includes objects with different motions. Moreover, an optimal motion vector can be detected per each area by using a motion vector detecting method suitable for dividing a block into areas with a threshold and a motion vector detecting method suitable for pixel blocks after divided into areas.

The above method can reduce degradation in image quality caused by block distortion. However, even according to the above method, a correct motion vector cannot be obtained in an area with few pixels and a shading (occlusion) area.

SUMMARY OF THE INVENTION

An apparatus according to one aspect of the present invention interpolates an interpolation frame between a first reference frame and a second reference frame. The apparatus includes a c motion vector detecting unit that detects a primary motion vector of each interpolation block in the interpolation frame by referring the first reference frame and the second reference frame; an area detecting unit that detects a first matching area in a first reference block in the first reference frame, a second matching area in a second reference block in the second reference frame, a first mismatching area in the first reference block and a second mismatching area in the second reference block, wherein the both the first matching area and the second matching area are matching and corresponding to each other, the both the first mismatching area and the second mismatching area are mismatching and corresponding to each other, both the first reference block and the second reference block have equal size and identical shape to the interpolation block, and each of the first reference block and the second reference block is specified based on the primary motion vector of the interpolation block; an assigning unit that assigns the primary motion vector of the each interpolation block to an interpolation matching area in the each interpolation block, wherein the interpolation matching area corresponds to the first matching area and the second matching area; a settling unit that settles a secondary motion vector to be assigned to an interpolation mismatching area in the each interpolation block based on surrounding interpolation blocks around the interpolation mismatching area, wherein the interpolation mismatching area corresponds to the first mismatching area and the second mismatching area, the first mismatching area and the second mismatching area being determined as mismatching each other by the determining unit; and a motion compensating unit that assigns an image onto the interpolation frame based on all of at least one motion vector of the primary motion vector assigned to the interpolation matching area by the assigning unit, and the secondary motion vector settled for the interpolation mismatching area by the settling unit.

An apparatus according to another aspect of the present invention interpolates an interpolation frame between a first reference frame and a second reference frame. The apparatus includes a motion vector detecting unit that detects a primary motion vector of a first reference block by referring the first reference frame and the second reference frame, the first reference block is obtained by dividing the first reference frame; an area detecting unit that detects a first matching area in the first reference block and a second matching area in a second reference block in the second reference frame, a first mismatching area in the first reference block and a second mismatching area in the second reference block, wherein the both the first matching area and the second matching area are matching and corresponding to each other, the both the first mismatching area and the second mismatching area are mismatching and corresponding to each other, the second reference block has equal size and identical shape to the first reference block, and the second matching area in the second reference block is specified based on the primary motion vector of the first reference block; an assigning unit that assigns the primary motion vector to the first matching area; a settling unit that settles a secondary motion vector to be assigned to a first mismatching area in the first reference block based on surrounding first reference blocks around the first mismatching area, wherein the first mismatching area is determined as mismatching by the determining unit; and a motion compensating unit that assigns an image onto the interpolation frame based on all of at least one motion vector of the primary motion vector assigned to the matching area by the assigning unit, and the secondary motion vector settled for the first mismatching area by the settling unit.

BRIEF DESCRIPTION OF THE DRAWINGS

FIG. 13 is a schematic for explaining a result of the area determination performed on another first reference block on the left to the first reference block shown in FIG. 8;

FIG. 40 is a schematic for explaining motion estimation by using a mismatching area according to the sixth embodiment.

DETAILED DESCRIPTION OF THE INVENTION

Exemplary embodiments of the present invention will be explained below in detail with reference to the accompanying drawings.

Figure 2:
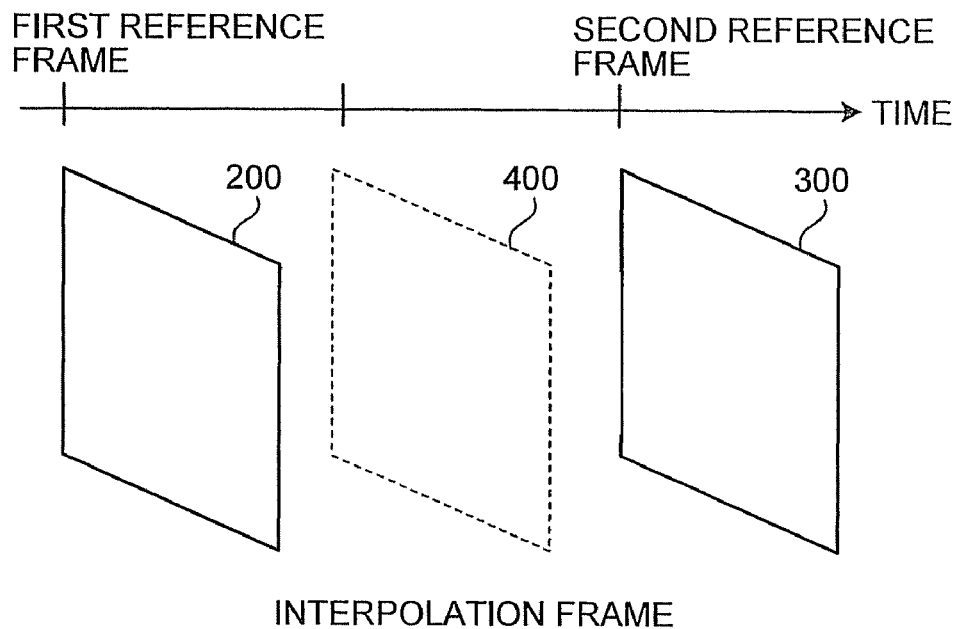
FIG. 2 is a schematic for explaining an interpolation frame created by the interpolation-frame creating apparatus.

An interpolation-frame creating apparatus 10 according to a first embodiment of the present invention creates an interpolation frame. As shown in FIG. 2, the first embodiment is explained in an example where the interpolation-frame creating apparatus 10 creates an interpolation frame 400 to interpolate between two successive frames included in an input image, namely, a first reference frame 200 and a second reference frame 300.

An interpolation frame created by the interpolation-frame creating apparatus 10 does not have to be arranged at a temporally middle point between two different frames. It is sufficient as long as the interpolation frame interpolates between two different frames, and not limited by the first embodiment.

Moreover, any number of interpolation frames can be created and inserted between two different frames.

Figure 1:
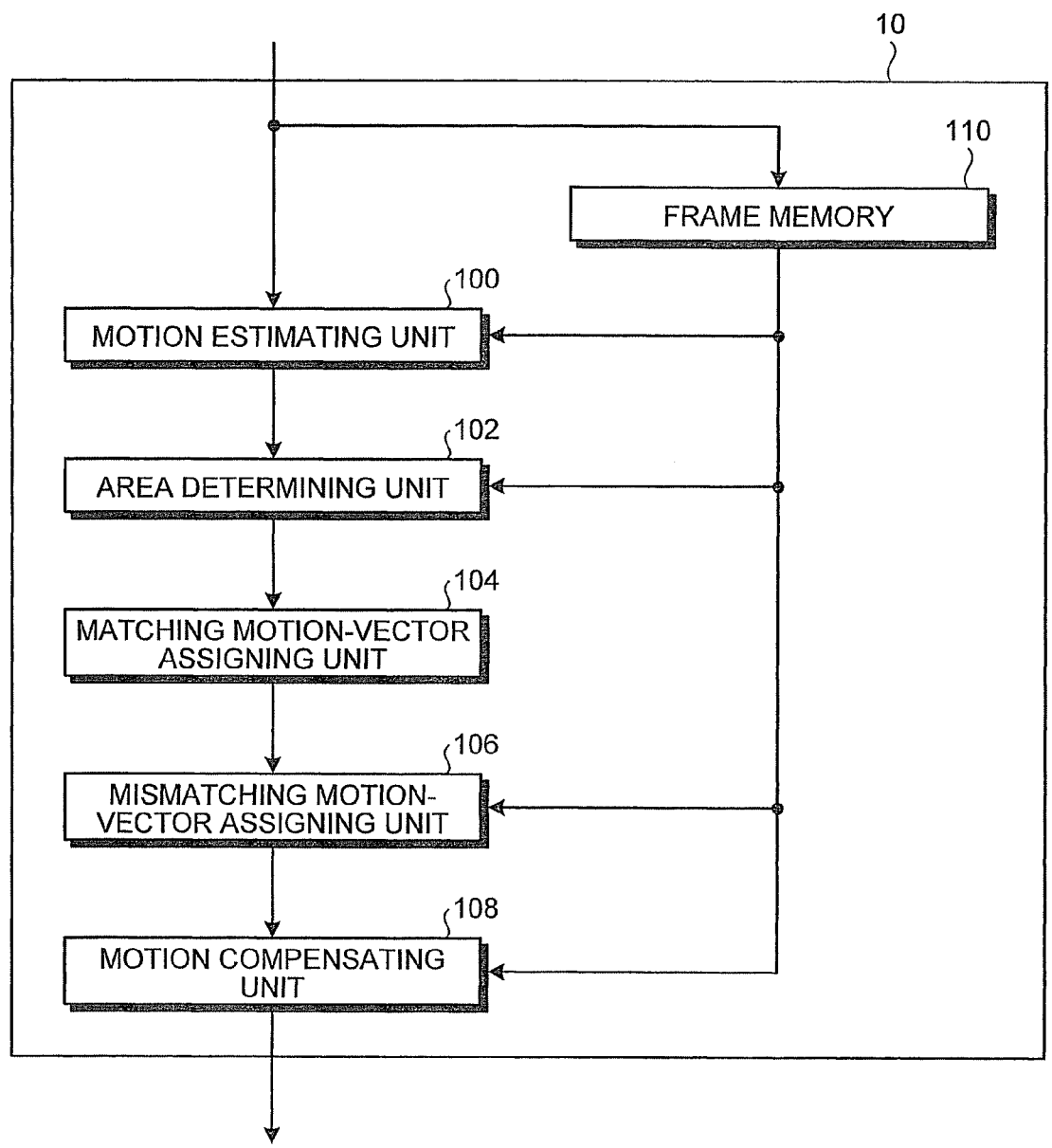
FIG. 1 is a functional block diagram of an interpolation-frame creating apparatus according to a first embodiment of the present invention.

As shown in FIG. 1, the interpolation-frame creating apparatus 10 includes a motion estimating unit 100, an area determining unit 102, a matching motion-vector assigning unit 104, a mismatching motion-vector assigning unit 106, a motion compensating unit 108, a frame memory 110.

Figure 3:
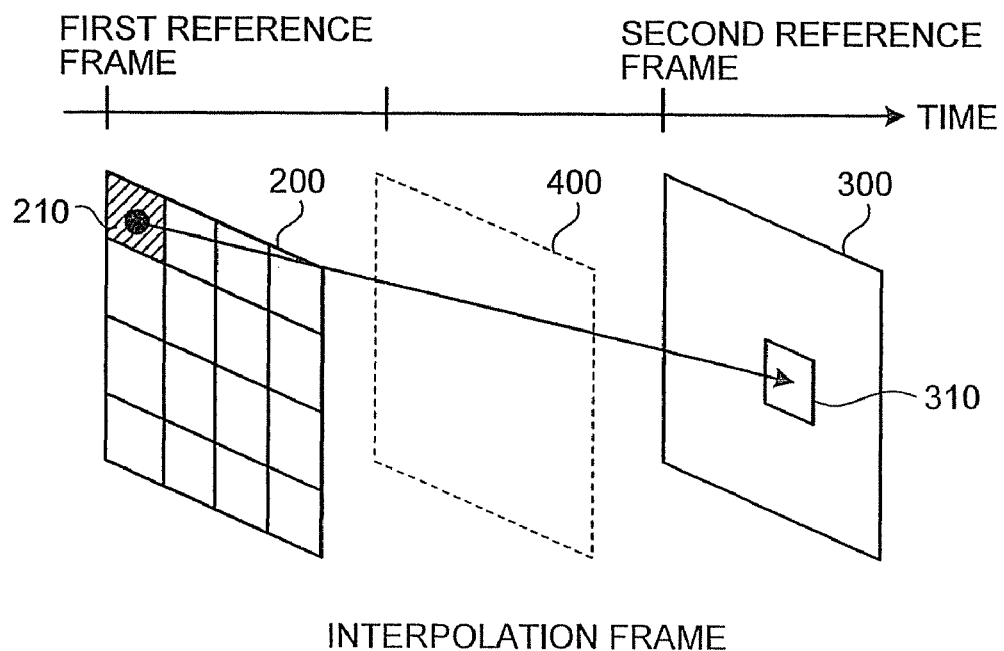
FIG. 3 is a schematic for explaining motion estimation according to the first embodiment.
Figure 4:
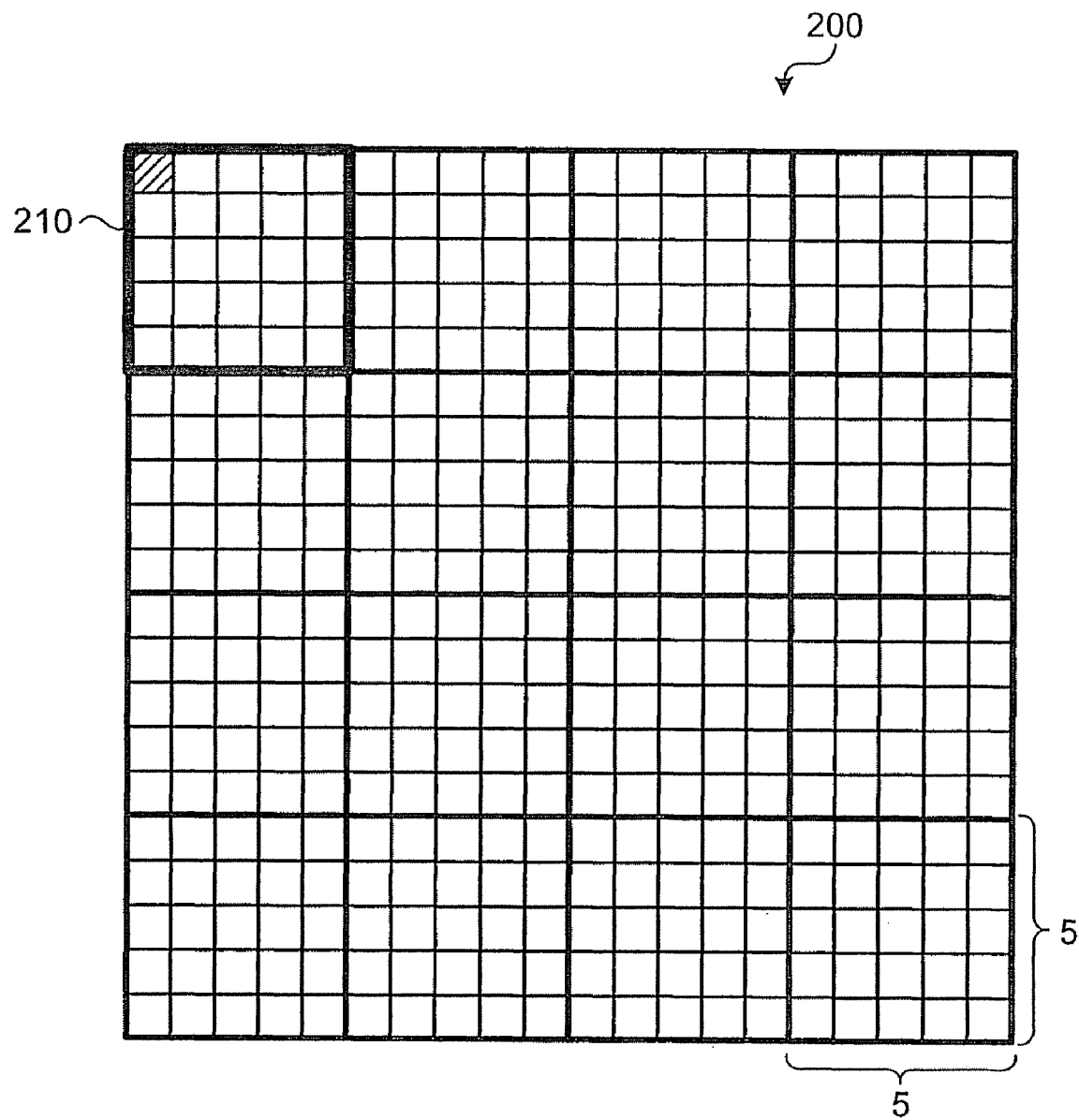
FIG. 4 is a schematic for explaining the motion estimation according to the first embodiment.

The motion estimating unit 100 estimates a motion from the first reference frame 200 to the second reference frame 300. As shown in FIGS. 3 and 4, the first reference frame 200 is divided into a plurality of macro-blocks, namely, first reference blocks including a first reference block 210. The motion estimating unit 100 according to the first embodiment divides the first reference frame 200 into 16 macro-blocks of 4×4. Each block includes 25 pixels of 5×5. The motion estimating unit 100 determines a correlation between the first reference block 210 and a second reference block 310 in the second reference frame 300, and calculates a motion vector based on the correlation. Here, the second reference block 310 is an area that has an identical shape and an equal size to the first reference block 210.

The area determining unit 102 calculates a correlation value between each pixel in the first reference block 210 and a corresponding pixel in the second reference frame 300 based on the motion vector calculated with respect to the macro-block by the motion estimating unit 100. Specifically, the area determining unit 102 specifies a certain pixel in the first reference block 210 and a corresponding pixel in the second reference frame 300 based on the motion vector calculated with respect to the first reference block 210. The area determining unit 102 then calculates a correlation value between these two pixels. Based on calculated correlation value, the area determining unit 102 divides each macro-block into a high-correlation area and a low-correlation area.

The matching motion-vector assigning unit 104 assigns the motion vector calculated by the motion estimating unit 100 to the high-correlation area determined by the area determining unit 102. The mismatching motion-vector assigning unit 106 assigns a motion vector assigned to a surrounding macro-block to the low-correlation area determined by the area determining unit 102. The motion compensating unit 108 converts motion vectors assigned by the matching motion-vector assigning unit 104 and the mismatching motion-vector assigning unit 106 in scale, and creates the interpolation frame 400 based on scale-converted vectors.

Figure 5:
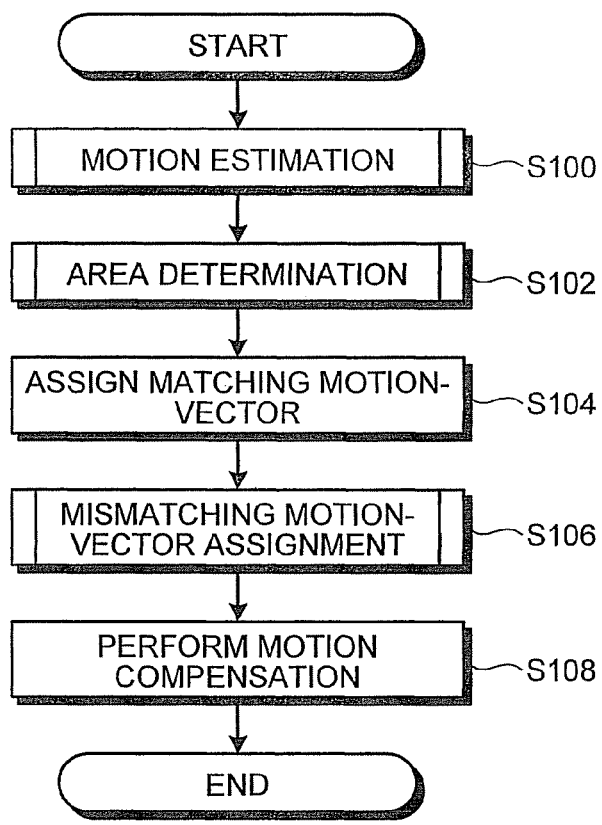
FIG. 5 is a flowchart of processing of interpolation frame creation performed by the interpolation-frame creating apparatus shown in FIG. 1.

As shown in FIG. 5, first of all at interpolation frame creation, the motion estimating unit 100 acquires the first reference frame 200 and the second reference frame 300 from the frame memory 110, and performs motion estimation to estimate a motion from the first reference frame 200 to the second reference frame 300 (step S100). Next, the area determining unit 102 determines areas based on resultant motion estimated by the motion estimating unit 100 (step S102).

The matching motion-vector assigning unit 104 then assigns the motion vector calculated by the motion estimating unit 100 to the high-correlation area (step S104). The mismatching motion-vector assigning unit 106 then assigns a motion vector assigned to a surrounding macro-block to the low-correlation area (step S106). The motion compensating unit 108 then performs motion compensation based on motion vectors assigned by the matching motion-vector assigning unit 104 and the mismatching motion-vector assigning unit 106. Namely, the motion compensating unit 108 creates the interpolation frame 400 (step S108). The interpolation-frame creating apparatus 10 then completes the interpolation frame creation.

Figure 6:
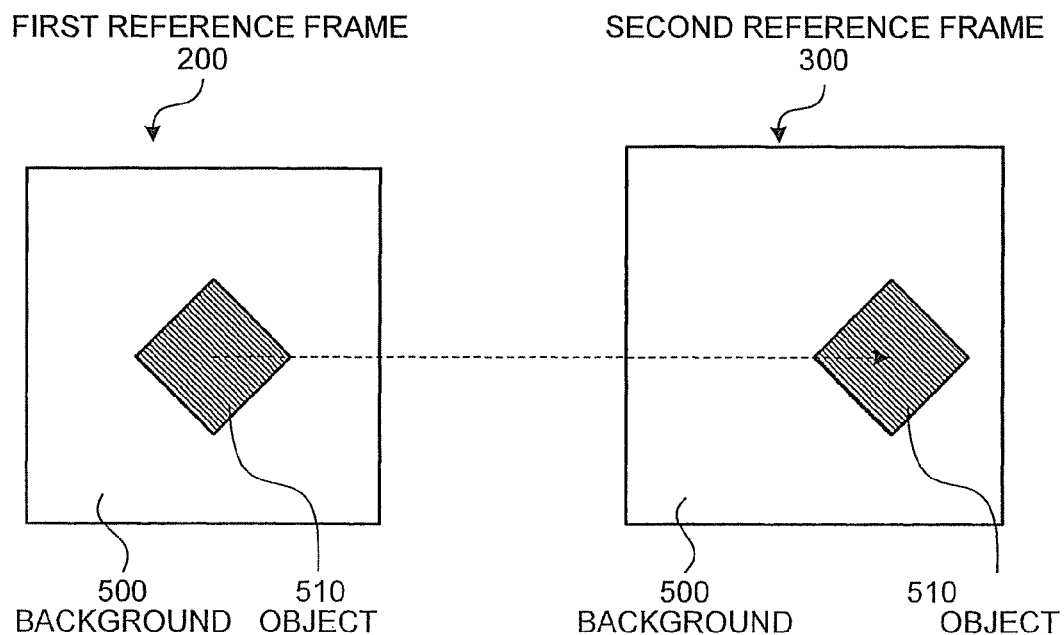
FIG. 6 depicts an example of a first reference frame and a second reference frame according to the first embodiment.

As shown in FIG. 6, each of the first reference frame 200 and the second reference frame 300 includes a background 500 and an object 510. Furthermore, the object 510 has moved rightward in the second reference frame 300. Specific processing of creating an interpolation frame between the first reference frame 200 and the second reference frame 300 shown in FIG. 6 will be explained below.

Figure 7:
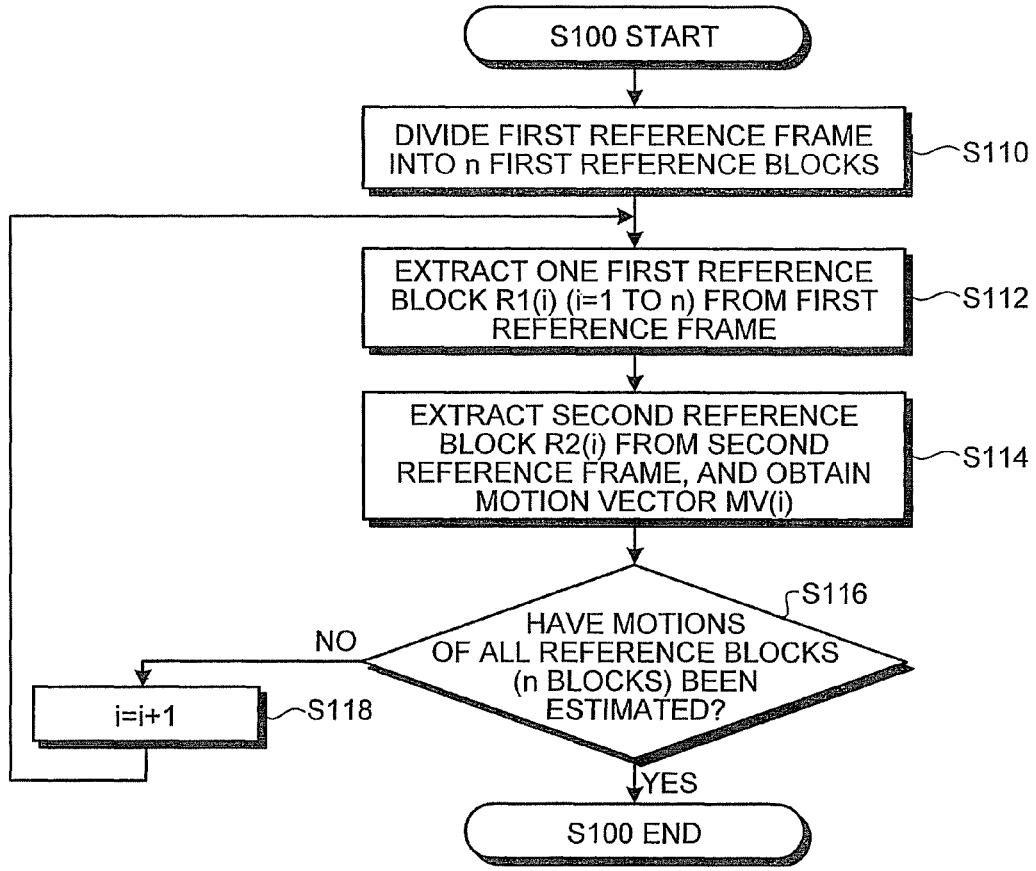
FIG. 7 is a flowchart of detailed processing at motion estimation in FIG. 5.

As shown in FIG. 7, first of all at the motion estimation (step S100), the motion estimating unit 100 divides the first reference frame 200 into n reference blocks subjected to the motion estimation (step S110). Specifically, the motion estimating unit 100 divides the first reference frame 200 shown in FIG. 6 into 16 blocks of first reference blocks as shown in FIG. 4.

Next, the motion estimating unit 100 extracts a first reference block R1($i$) from the first reference frame 200 (step S112). The motion estimating unit 100 then extracts a second reference block R2($i$) that has a highest correlation to extracted first reference block R1($i$), and obtains a motion vector MV(i) (step S114). If there is any first reference block that has not been performed with the above processing (No at step S116), the motion estimating unit 100 adds "1" to the value of i (step S118), and then goes back to step S112. When the motion estimating unit 100 has performed processing at steps S112 and S114 on all first reference blocks (Yes at step S116), the motion estimation (step S100) is completed.

To obtain the second reference block R2($i$) with the highest correlation, absolute differences between pixels in the first reference block and corresponding pixels in a candidate second reference block can be used. Specifically, an absolute difference is calculated between every single pixel in the first reference block and its corresponding pixel in a candidate second reference block. A quantity of highly-correlated pixels, each of which has an absolute difference smaller than a threshold, is then calculated. A second reference block that has the largest quantity of highly-correlated pixels is determined as the second reference block with the highest correlation to the first reference block.

Figure 8:
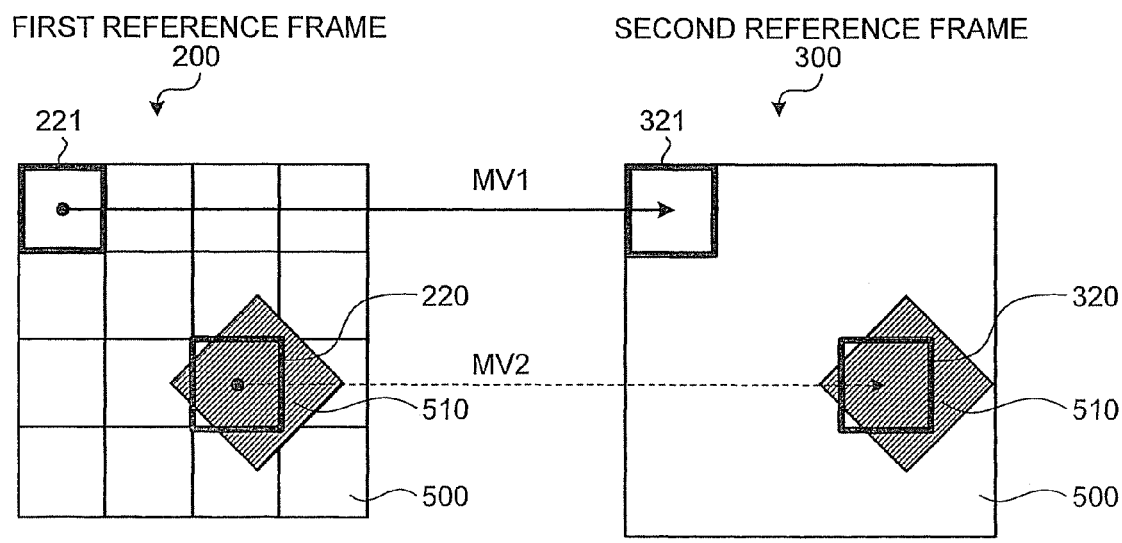
FIG. 8 is a schematic for explaining the motion estimation performed on the first reference frame and the second reference frame shown in FIG. 6.
Figure 9:
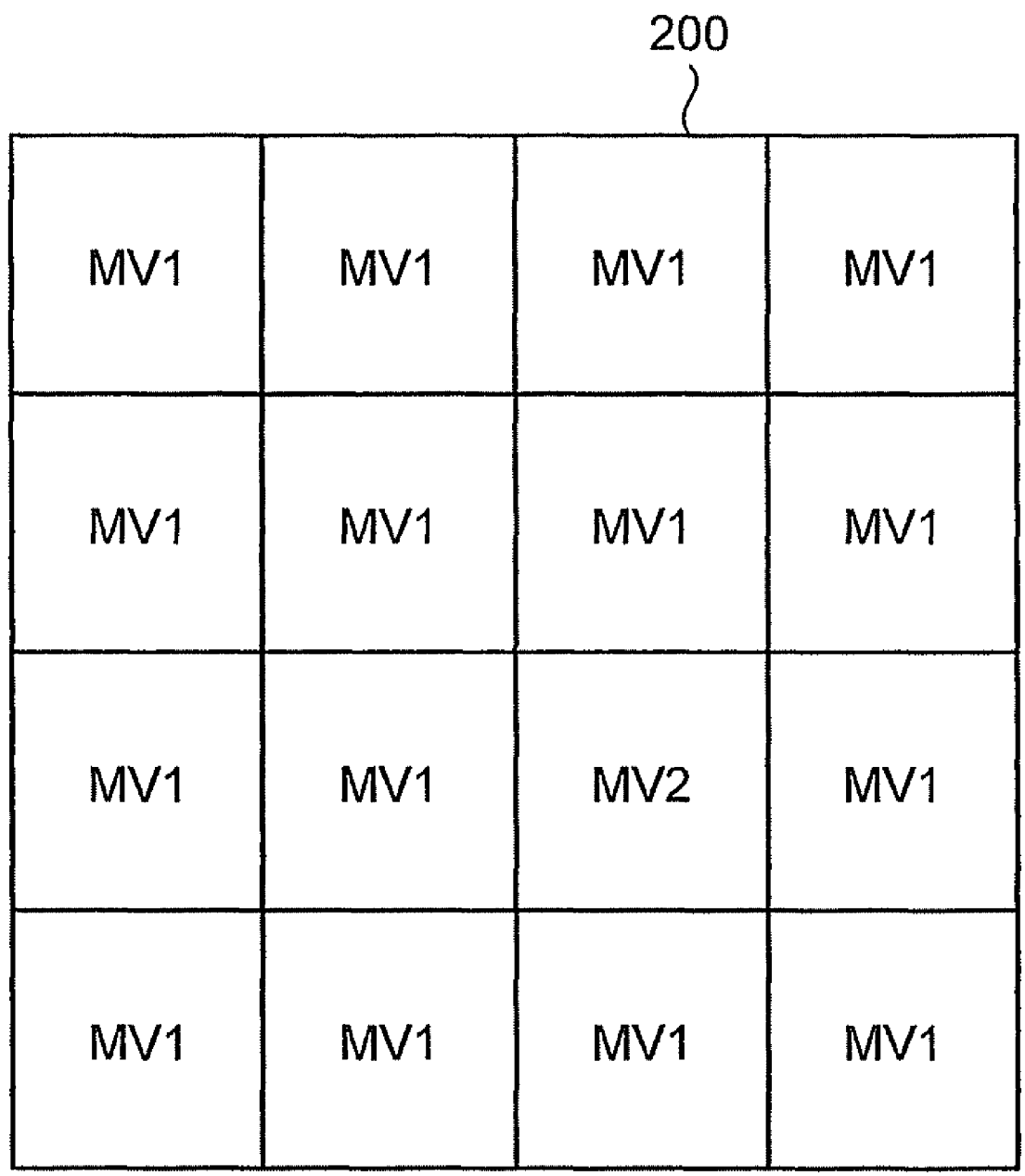
FIG. 9 depicts the result of the motion estimation shown in FIG. 8.

From the first reference frame 200 and the second reference frame 300 shown in FIG. 6, a result of the motion estimation as shown in FIGS. 8 and 9 is obtained. In this example, a motion vector MV1 (MV1=0) is calculated from a pair of corresponding reference blocks both of which include the same part of the background 500. For example, a first reference block 221 and a second reference block 321 include the same part of the background 500, so that the motion vector MV1 is calculated. On the other hand, a motion vector MV2 that is other than "0" is calculated from a pair of corresponding reference blocks both of which include the same part of the object 510. For example, a first reference block 220 and a second reference block 320 include the same part of the object 510, so that the motion vector MV2 is calculated.

Figure 10:
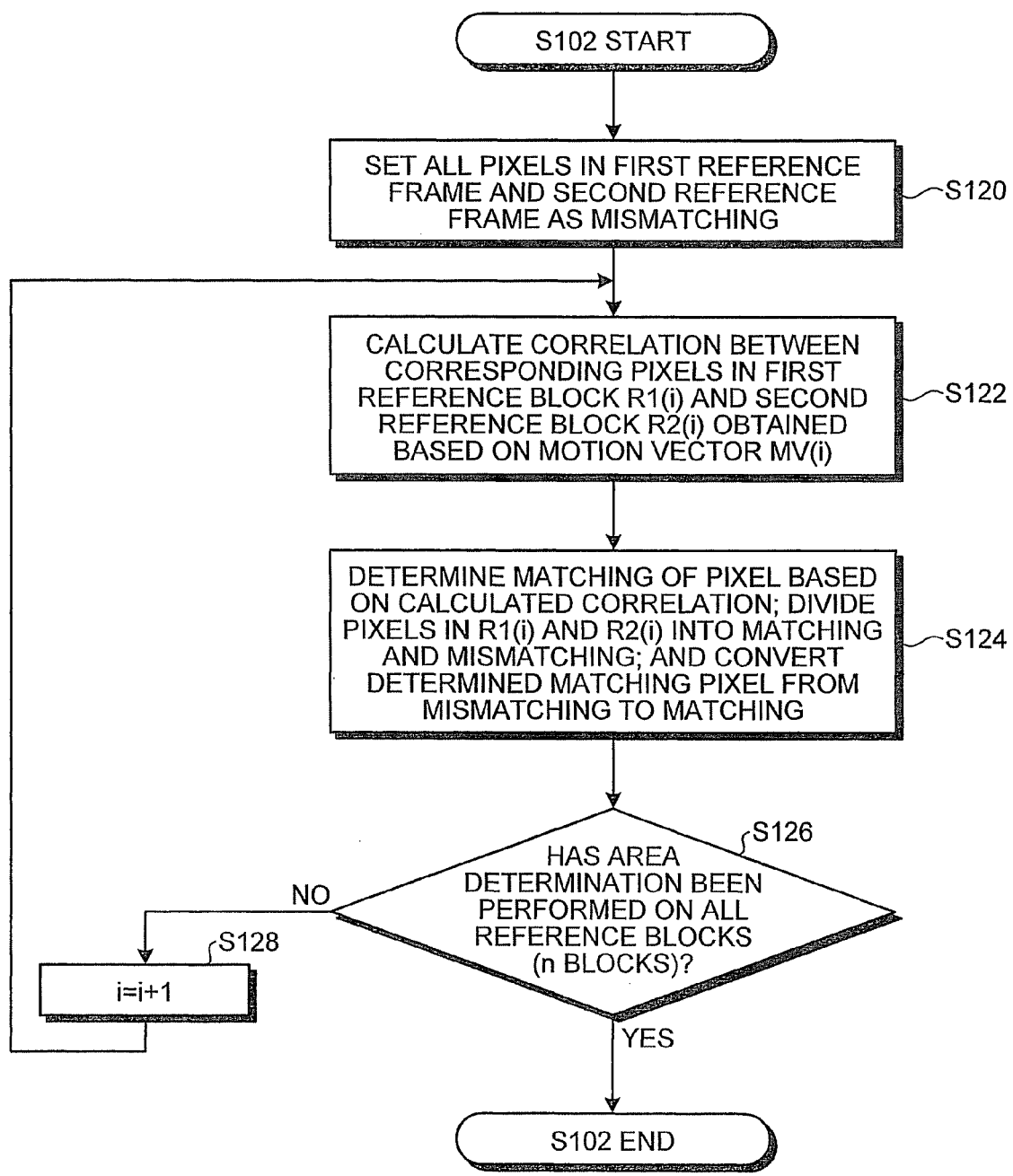
FIG. 10 is a flowchart of detailed processing at area determination in FIG. 5.

As shown in FIG. 10, first of all at the area determination (step S102), the area determining unit 102 sets all pixels in the first reference frame 200 and the second reference frame 300 as a mismatching area (step S120). Next, in a pair of a first reference block R1($i$) and a second reference block R2($i$) which is obtained based on a motion vector MV(i) calculated by the motion estimating unit 100, the area determining unit 102 calculates a correlation between corresponding pixels (step S122).

Next, the area determining unit 102 determines whether the corresponding pixels match each other based on calculated correlation. If the pixels match each other, the area determining unit 102 converts the pixels from the mismatching area to the matching area (step S124). If there is any first reference block R1($i$) that has not been performed with the above processing (No at step S126), the area determining unit 102 adds "1" to the value of i (step S128), and then goes back to step S122. When the area determining unit 102 has performed processing at steps S122 and S124 on all first reference blocks (Yes at step S126), the area determination (step S102) is completed.

Figure 11:
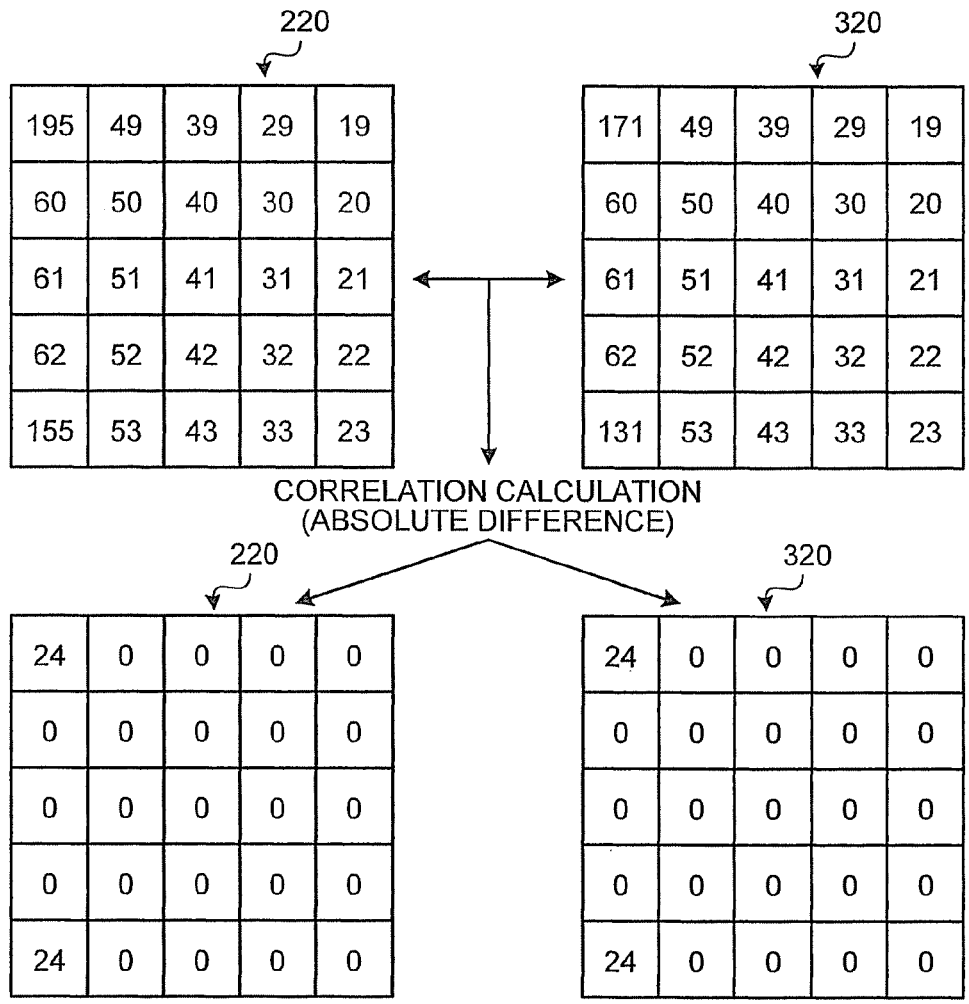
FIG. 11 is a schematic for explaining correlation calculation between a first reference block assigned with a motion vector MV2 shown in FIG. 8 and a second reference block corresponding to the first reference block.

Values in upper blocks in FIG. 11 indicate luminance. To determine a correlation between the first reference block 220 and the second reference block 320, the area determining unit 102 performs correlation calculation between corresponding pixels in the first reference block 220 and the second reference block 320 with respect to luminance. Specifically, the area determining unit 102 calculates an absolute difference of luminance. Values in lower blocks in FIG. 11 indicate calculation results, namely, absolute differences.

The first reference block 220 and the second reference block 320 mainly include an image of the object 510, and respective luminance values of pixels corresponding to the part of the object 510 match each other. Accordingly, an absolute difference is zero. However, in the parts of the background 500 included in the first reference block 220 and the second reference block 320, luminance values of pixels are not matching, because each of the parts presents a different part of the background 500, so that an absolute difference is not zero. In FIG. 11, a pixel at the upper left corner and a pixel at the lower left corner in each of the first reference block 220 and the second reference block 320 correspond to the background, and only these pixels have an absolute difference of 24.

Figure 12:
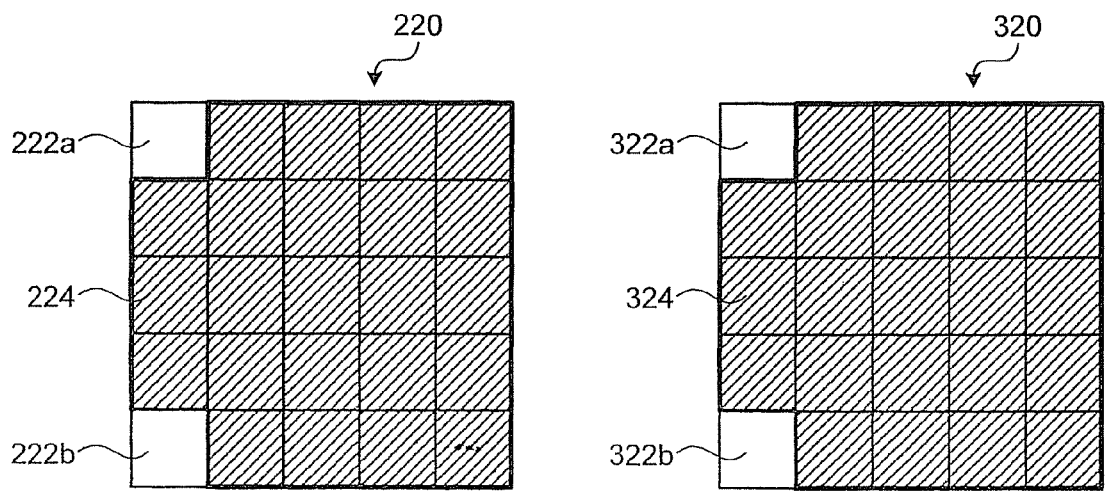
FIG. 12 depicts a matching area and mismatching areas obtained by the correlation calculation in FIG. 11.

As shown in FIG. 12, respective pixels at the upper left corner and the lower left corner in the first reference block 220 and the second reference block 320 shown in FIG. 11 correspond to mismatching areas 222a, 222b, 322a, or 322b. The rest of pixels are all in matching areas 224 or 324. Determination of matching area and mismatching area uses a threshold. If an absolute difference between a pair of corresponding pixels is smaller than the threshold, i.e., a correlation between the corresponding pixels is high, the pixels are determined as a matching area. If the absolute difference is larger than the threshold, i.e., the correlation is low, the pixels are determined as a mismatching area.

As shown in FIG. 13, the part of the background 500 in a first reference block 230 matches the part of the background 500 in the second reference frame 300, thereby forming a matching area. On the other hand, the part of the object 510 in the first reference block 230 turns to the background 500 in the second reference frame 300, thereby forming a mismatching area.

Figure 14:
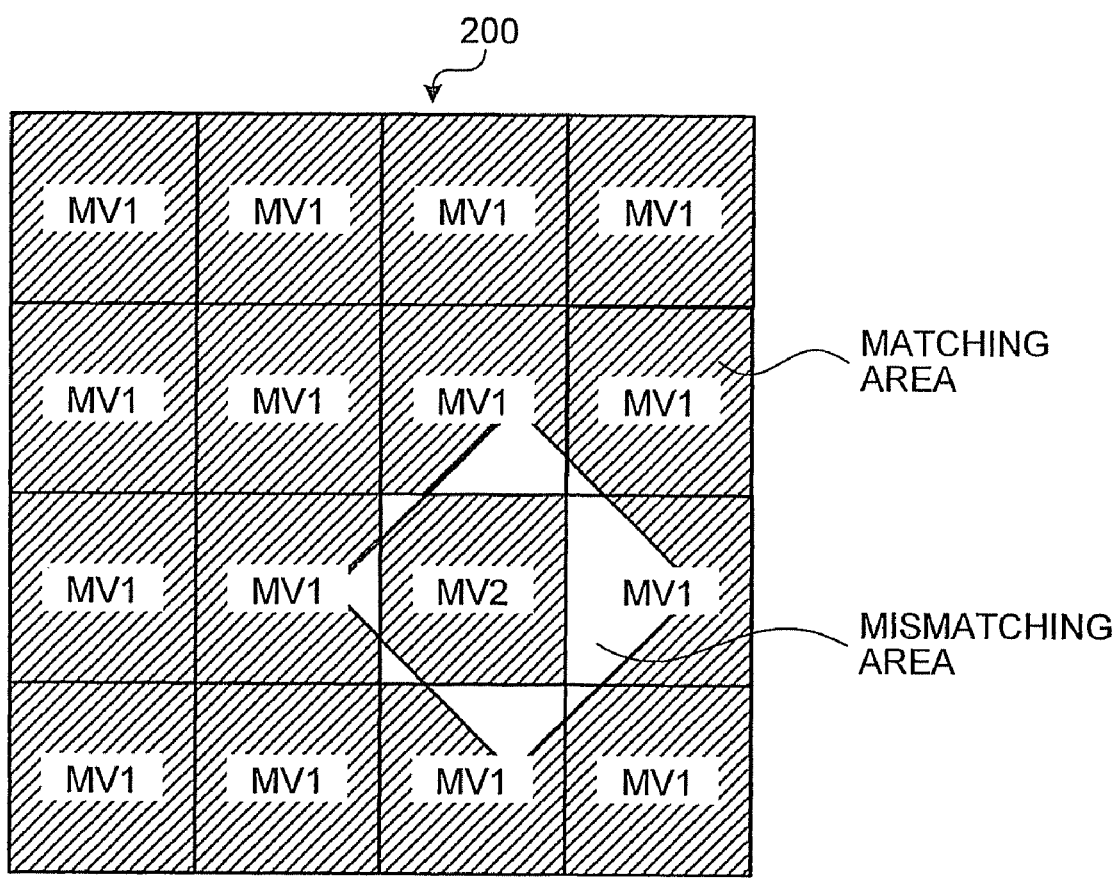
FIG. 14 depicts a result of the area determination performed on the whole first reference frame shown in FIG. 8.

As shown in FIG. 14, first reference blocks are divided into matching areas and mismatching areas pixel by pixel. At the matching motion-vector assignment (step S104), a matching area is assigned with a motion vector that is calculated by the motion estimating unit 100 for a first reference block that includes the matching area. In the matching area, corresponding pixels match each other, in other words, the motion vector is correctly calculated. The motion vector calculated by the motion estimating unit 100 at the motion estimation (step S100) is appropriate to the matching area, therefore, the matching motion-vector assigning unit 104 assigns the motion vector to the matching area.

Figure 15:
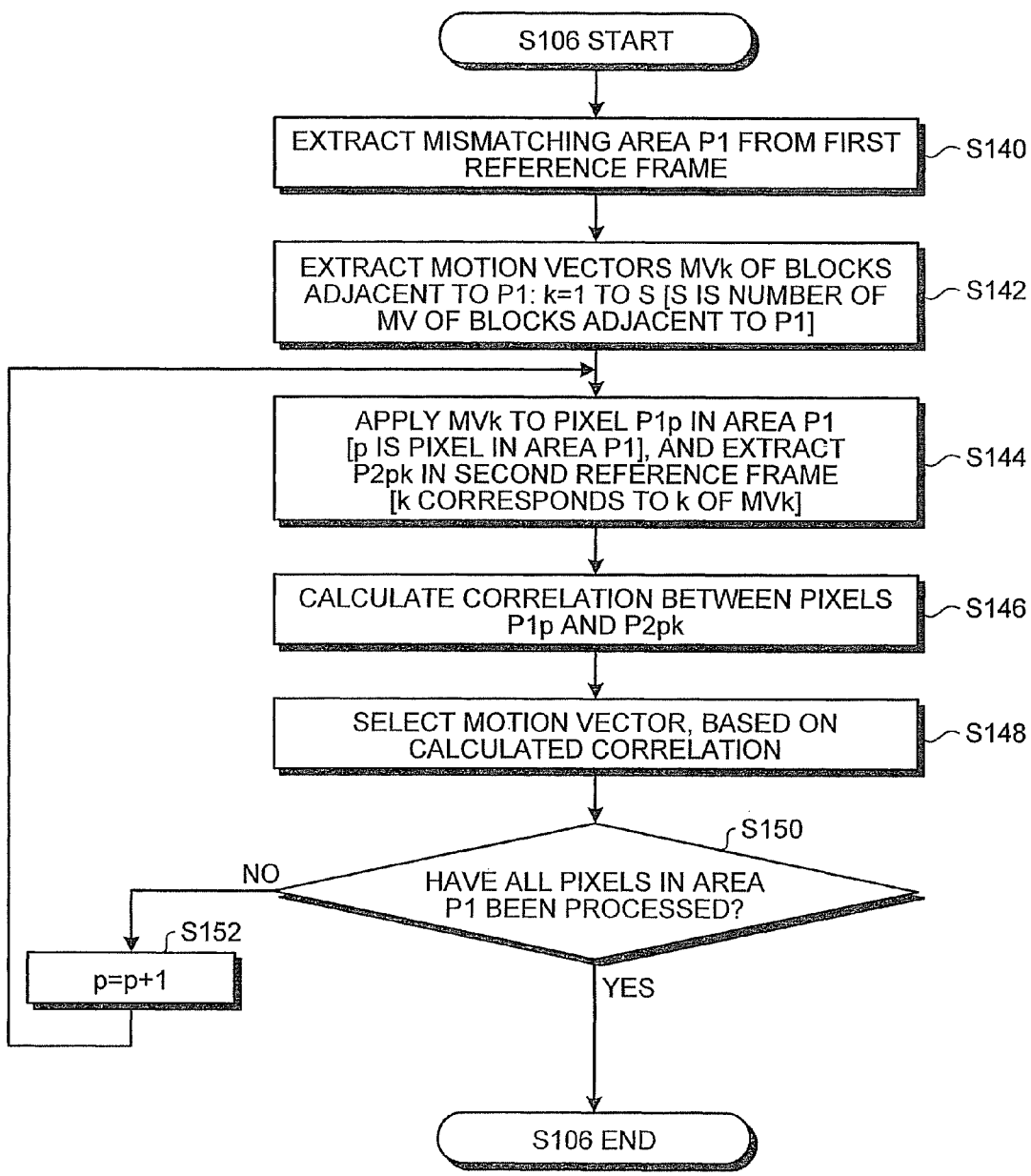
FIG. 15 is a flowchart of detailed processing at mismatching motion-vector assignment in FIG. 5.

As shown in FIG. 15, first of all at the mismatching motion-vector assignment (step S106), the mismatching motion-vector assigning unit 106 extracts a mismatching area P1 from the first reference frame 200 (step S140). Next, the mismatching motion-vector assigning unit 106 extracts motion vectors MVk of the first reference blocks adjacent to the mismatching area (k=1 to S, S is the number of motion vectors MV of the first reference blocks adjacent to the mismatching area)(step S142). Here, the mismatching motion-vector assigning unit 106 extracts all motion vectors of the adjacent first reference blocks. For example, if there are two motion vectors, the mismatching motion-vector assigning unit 106 extracts the two motion vectors. If all of the adjacent first reference blocks have the same motion vector, the mismatching motion-vector assigning unit 106 extracts the one motion vector.

Next, the mismatching motion-vector assigning unit 106 applies an extracted motion vector MVk to each pixel P1p (p is a pixel in the mismatching area P1) in the mismatching area, and extracts a corresponding pixel P2pk (k corresponds to k of the motion vector MVk) in the second reference frame 300 (step S144). In other words, pixel(s) P2pk can be extracted as many as the extracted motion vector(s) MVk.

The mismatching motion-vector assigning unit 106 then calculates a correlation between a P1p and an extracted pixel P2pk (step S146). Specifically, the mismatching motion-vector assigning unit 106 calculates an absolute difference of luminance between the pixel P1p and the pixel P2pk. Based on calculated correlations, the mismatching motion-vector assigning unit 106 then selects a motion vector appropriate to the pixel P1p from the motion vectors MVk (step S148). If the extracted motion vectors are plural, the mismatching motion-vector assigning unit 106 selects a motion vector corresponding to the smallest absolute difference in absolute differences each of which is calculated with respect to each of the motion vectors, i.e., a motion vector that has the highest correlation.

When the mismatching motion-vector assigning unit 106 has performed the above processing on all pixels in the mismatching areas (Yes at step S150), the mismatching motion-vector assignment (step S106) is completed. If there is any pixel that has not been performed with the above processing (No at step S150), the mismatching motion-vector assigning unit 106 adds "1" to the value of p (step S152), and then goes back to step S144.

Figure 16:
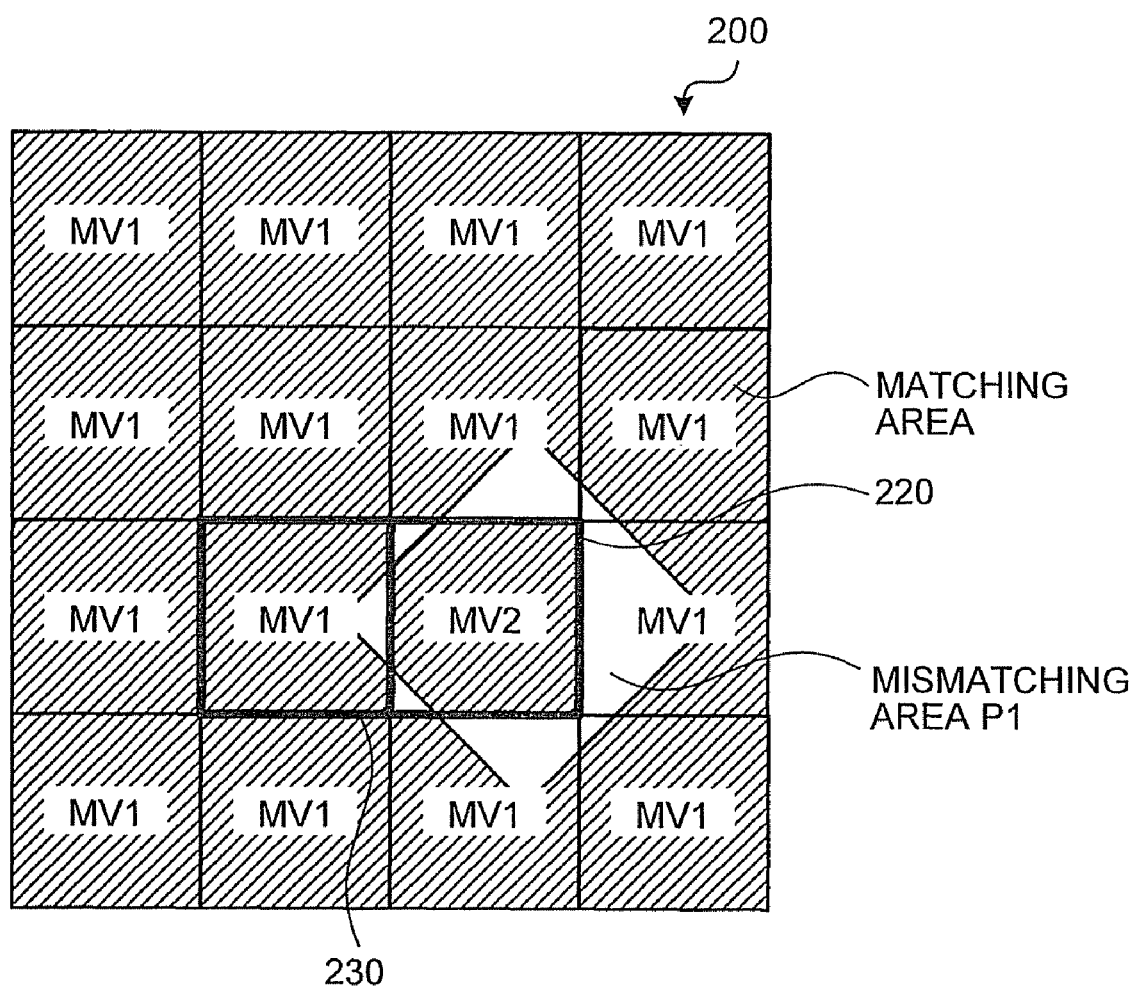
FIG. 16 depicts matching areas and mismatching areas in the first reference frame.

As shown in FIG. 16, for example, motion vectors extracted for the mismatching areas of an upper left pixel and a lower left pixel included in the first reference block 220 are respective motion vectors of eight first reference blocks adjacent to the first reference block 220. These are all MV1. Therefore, the mismatching areas 222a and 222b are assigned with the motion vector MV1.

On the other hand, motion vectors extracted for a mismatching area 232 of a center right pixel included in the first reference block 230 are respective motion vectors of eight first reference blocks adjacent to the first reference block 230. Namely, the motion vector MV1 and the motion vector MV2 are extracted.

In this case, suppose the pixel of the mismatching area 232 is a first pixel, the first pixel and the motion vector MV1 defines a second pixel in the second reference frame 300, and the first pixel and the motion vector MV2 defines a third pixel in the second reference frame 300. The mismatching motion-vector assigning unit 106 then calculates a correlation between the fist pixel and the second pixel. Similarly, the mismatching motion-vector assigning unit 106 calculates a correlation between the first pixel and the third pixel. The mismatching motion-vector assigning unit 106 selects a motion vector that provides the smallest absolute difference in calculated correlations, i.e., a motion vector that obtains the highest correlation. In this example, a correlation calculated from the motion vector MV2 is the highest, so that the mismatching motion-vector assigning unit 106 selects the motion vector MV2.

Thus, the interpolation-frame creating apparatus 10 according to the fist embodiment can assign a motion vector to an area smaller than a macro-block. Furthermore, the interpolation-frame creating apparatus 10 converts the motion vectors calculated via the above processing in scale, and assigns an image to a determined area in an interpolation frame, thereby creating the interpolation frame more precisely.

Continuous blocks in each frame are often assigned with the same motion vector. Accordingly, in the first embodiment, candidate motion vectors for a mismatching area are selected from motion vectors of adjacent blocks. This allows the interpolation-frame creating apparatus 10 to omit reprocessing of the motion estimation on each mismatching area, thereby achieving more efficient processing.

Furthermore, when the first reference frame 200 and the second reference frame 300 include three or more motion vectors, the interpolation-frame creating apparatus 10 can calculate each motion vector per subarea.

Figure 17:
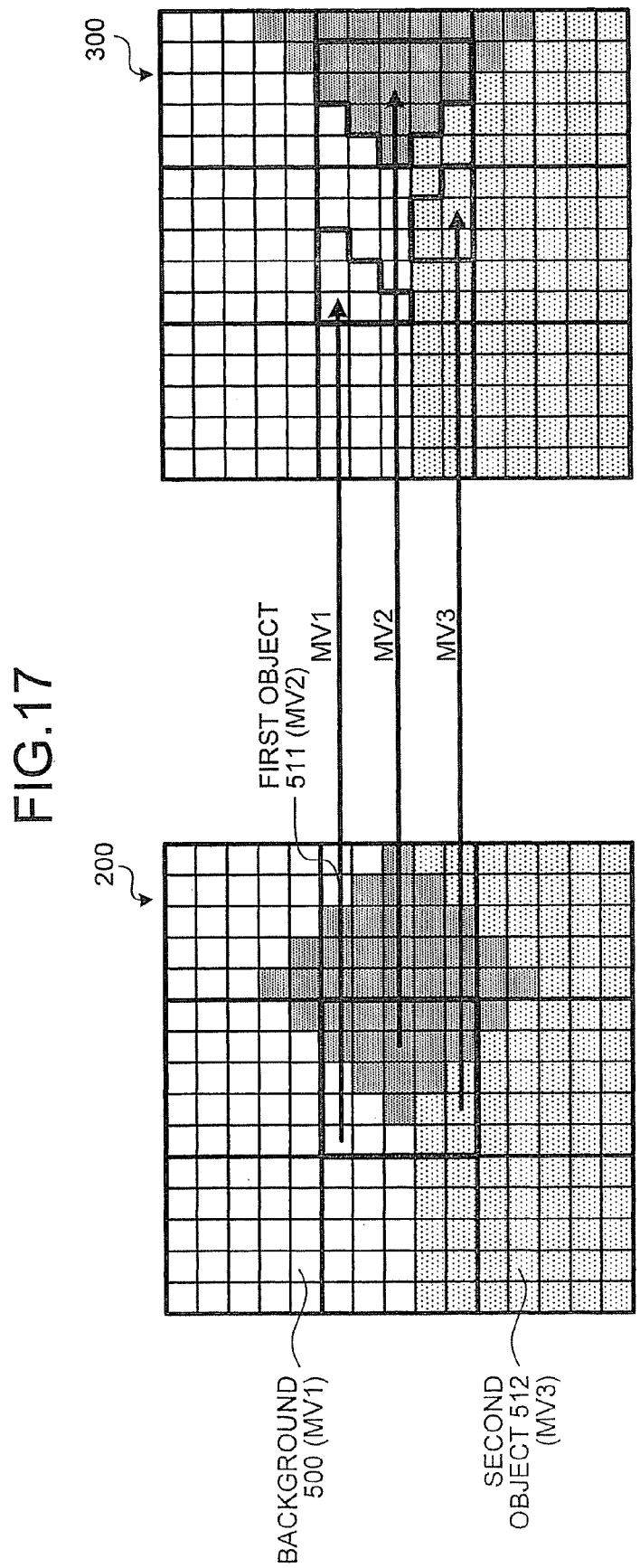
FIG. 17 is a schematic for explaining a first reference frame and a second reference frame that include three motion vectors.

The first reference frame 200 shown in FIG. 17 includes the background 500, a first object 511, and a second object 512, as an example. The background 500 is in an area with the motion vector MV1. The first object 511 is in an area with the motion vector MV2. The second object 512 is in an area with a motion vector MV3.

Figure 18:
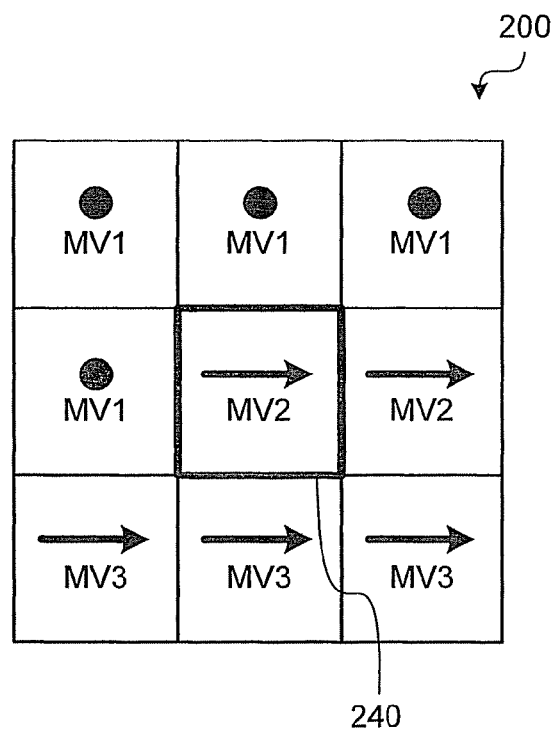
FIG. 18 depicts motion vectors from the first reference frame to the second reference frame shown in FIG. 17.
Figure 19:
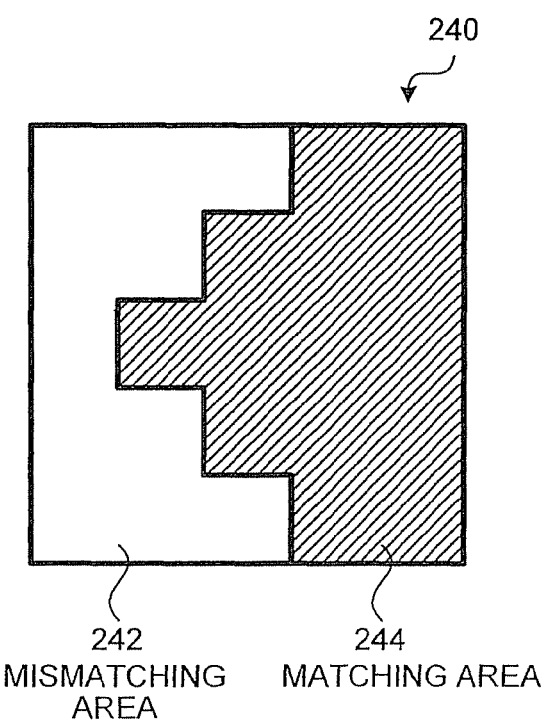
FIG. 19 depicts a result of area determination in a first reference block in the first reference frame shown in FIG. 18.

For example, focus attention on a first reference block 240 shown in FIG. 18. As shown in FIG. 19, in the first reference block 240, pixels corresponding to the first object 511 are determined as a matching area 244, and the other pixels are determined as a mismatching area 242.

At the mismatching motion-vector assignment performed on the mismatching area 242, the mismatching motion-vector assigning unit 106 extracts motion vectors of eight first reference blocks adjacent the first reference block 240 shown in FIG. 18. Precisely, the motion vectors MV1, MV2, and MV3 are extracted. The mismatching motion-vector assigning unit 106 calculates a correlation between each pixel in the mismatching area 242 and a corresponding pixel in the second reference frame 300 determined with each of the motion vectors MV1, MV2, and MV3, and then selects a motion vector with the highest correlation as a motion vector for the each pixel in the mismatching area 242. In this example, in the mismatching area 242 in the first reference block 240, an area corresponding to the background 500 is assigned with the motion vector MV1 as a result of the above processing. Another area corresponding to the second object 512 is assigned with the motion vector MV3 as a result of the above processing.

Thus, the interpolation-frame creating apparatus 10 can assign a motion vector to each pixel, thereby specifying the motion vector precisely. Furthermore, by using the motion vector, the interpolation-frame creating apparatus 10 can create a highly precise interpolation frame.

Figure 20:
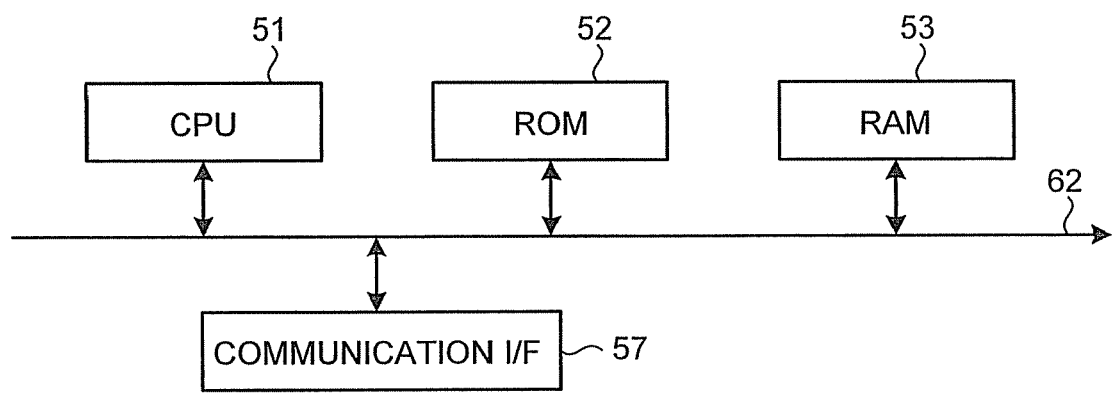
FIG. 20 is a block diagram of hardware configuration of the interpolation-frame creating apparatus according to the first embodiment.

As shown in FIG. 20, as hardware configuration, the interpolation-frame creating apparatus 10 includes a read-only memory (ROM) 52, a central processing unit (CPU) 51, a random access memory (RAM) 53, a communication interface (I/F) 57, and a bus 62. The ROM 52 stores therein computer programs, for example, an interpolation-frame creating computer program that causes a computer to execute the interpolation frame creation. The CPU 51 controls each unit in the interpolation-frame creating apparatus 10 in accordance with computer programs present in the ROM 52. The RAM 53 stores therein various data necessary for control of the interpolation-frame creating apparatus 10. The communication I/F 57 connects the interpolation-frame creating apparatus 10 to a network to operate communications. The bus 62 connects each unit in the interpolation-frame creating apparatus 10.

The interpolation-frame creating computer program in the interpolation-frame creating apparatus 10 can be provided in a form of a computer-readable recording medium, such as a compact disc read-only memory (CD-ROM), a floppy disk (FD), or a digital versatile disc (DVD), on which a file of the interpolation-frame creating computer program is recorded in a installable format or a executable format.

In this case, the interpolation-frame creating computer program is designed to be read out from such computer-readable recording medium and to be executed on the interpolation-frame creating apparatus 10, so that the computer program is loaded onto a main memory storage in the interpolation-frame creating apparatus 10, and, for example, each unit shown in FIG. 1 is formed on the main memory storage.

Alternatively, as a computer connected to a network, such as the Internet, stores thereon the interpolation-frame creating computer program according to the first embodiment, the computer program can be provided by downloading via the network.

Various modifications and refinements can be added to the first embodiment.

As one of such modifications, a first modification allows the mismatching motion-vector assigning unit 106 to extract any potential motion vector for a mismatching area, which is not limited to the motion vectors of the blocks adjacent to the mismatching area as described in the first embodiment.

For example, due to characteristics of a subject image, if there is a possibility that a motion vector present in an area at some distance from the mismatching area can be appropriate for the subject image, the mismatching motion-vector assigning unit 106 can extract a motion vector in areas within a certain distance as a candidate in addition to the motion vectors of the adjacent blocks, thereby enabling the mismatching motion-vector assigning unit 106 to select a motion vector more precisely.

In the first embodiment, the matching motion-vector assigning unit 104 assigns the motion vector calculated by the motion estimating unit 100 to the matching area, and the mismatching motion-vector assigning unit 106 assigns a motion vector of an adjacent reference block to the mismatching area. Instead of this, as a second modification, the motion vector calculated by the motion estimating unit 100 can be assigned to all of the reference blocks at first. When the area determining unit 102 determines a mismatching area and a different motion vector is required to be assigned, the motion vector that is already assigned is replaced with another appropriated motion vector. This can achieve more efficient processing in some cases.

According to a third modification, when the size of a mismatching area is smaller than a predetermined size, the area can be included into a surrounding matching area rather than being set as a mismatching area.

For example, if the number of pixels included in a mismatching area is extremely small, such as one pixel, it is difficult to detect a motion vector for the pixel precisely. Therefore, such small area is to be processed similarly to a surrounding matching area rather than being processed as a mismatching area.

This allows a mismatching area determined by error, such as a mismatching area erroneously determined due to noise, to be converted to a matching area, thereby improving the precision of motion vector detection.

In another example, if matching areas are scattered in a mismatching area, a motion-vector inapplicable area can be modified to a motion-vector applicable area. Specifically, isolated points are eliminated by using two values of the motion-vector applicable area and the motion-vector inapplicable area, or by filtering with morphology calculation. It should be noted that if a large area be eliminated as an isolated point, an existing small area may be eliminated in some cases.

In the first embodiment, the area determining unit 102 determines whether an area is matching by comparing a correlation value and a threshold. The threshold is not particularly limited. According to a fourth modification, for example, the threshold can be a relative value, and also an absolute value in another example.

Furthermore, the threshold can vary frame to frame. For example, when a scene is dark, the threshold can be set lower, thereby achieving precise determination of an area including different motions in dark scene. Moreover, the threshold can be set higher at an edge, thereby achieving precise determination of the edge.

According to a fifth modification, the area determining unit 102 can calculate a correlation of chrominance instead of that of luminance calculated in the first embodiment.

Figure 21:
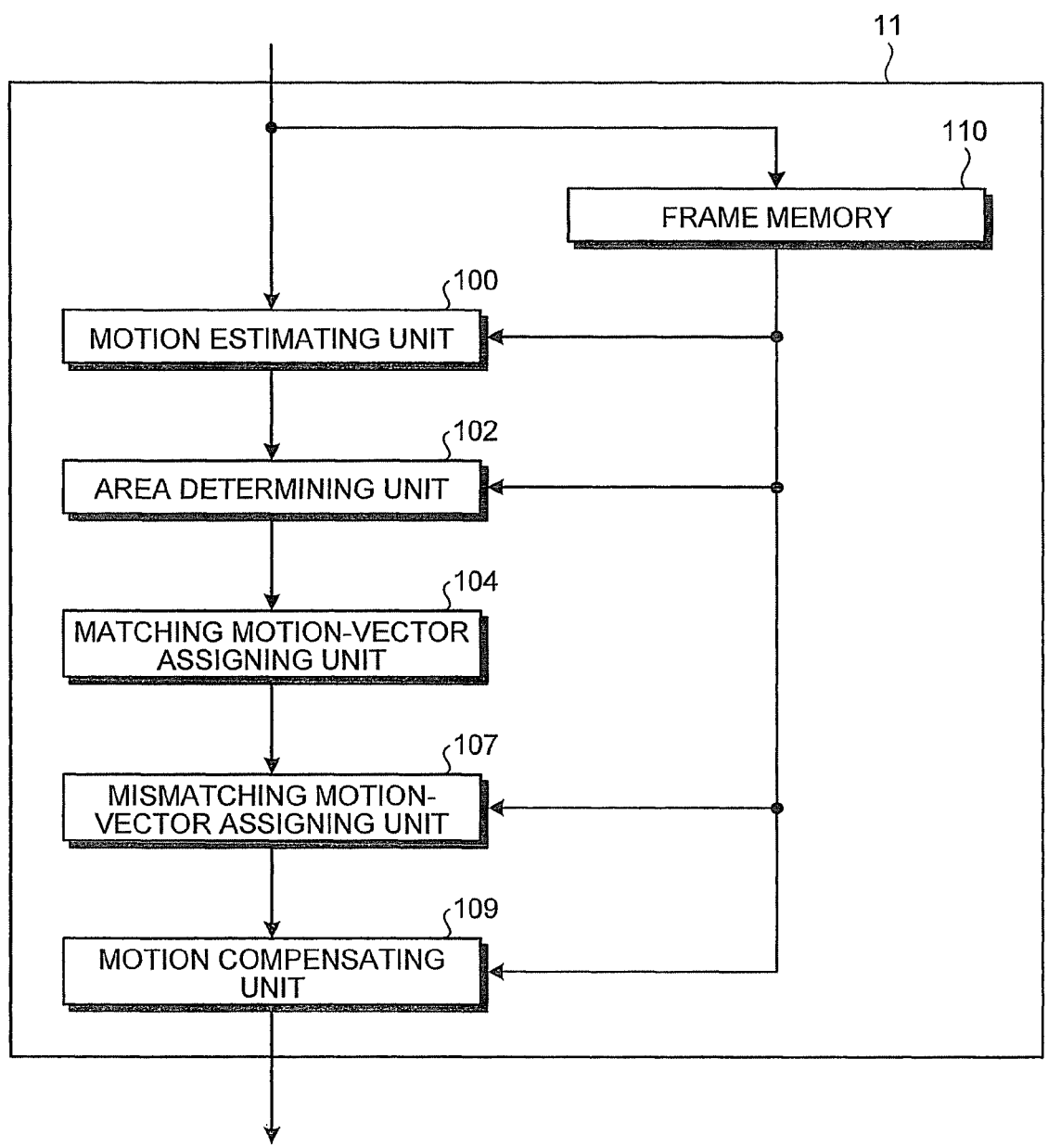
FIG. 21 is a functional block diagram of an interpolation-frame creating apparatus according to a second embodiment of the present invention.

In an interpolation-frame creating apparatus 11 according to a second embodiment of the present invention shown in FIG. 21, a mismatching motion-vector assigning unit 107 specifies an area in which any appropriate motion vector is not found, namely, an undetected area. A motion compensating unit 109 assigns an average of adjacent pixels to the undetected area, instead of a motion vector of an adjacent block.

Figure 22:
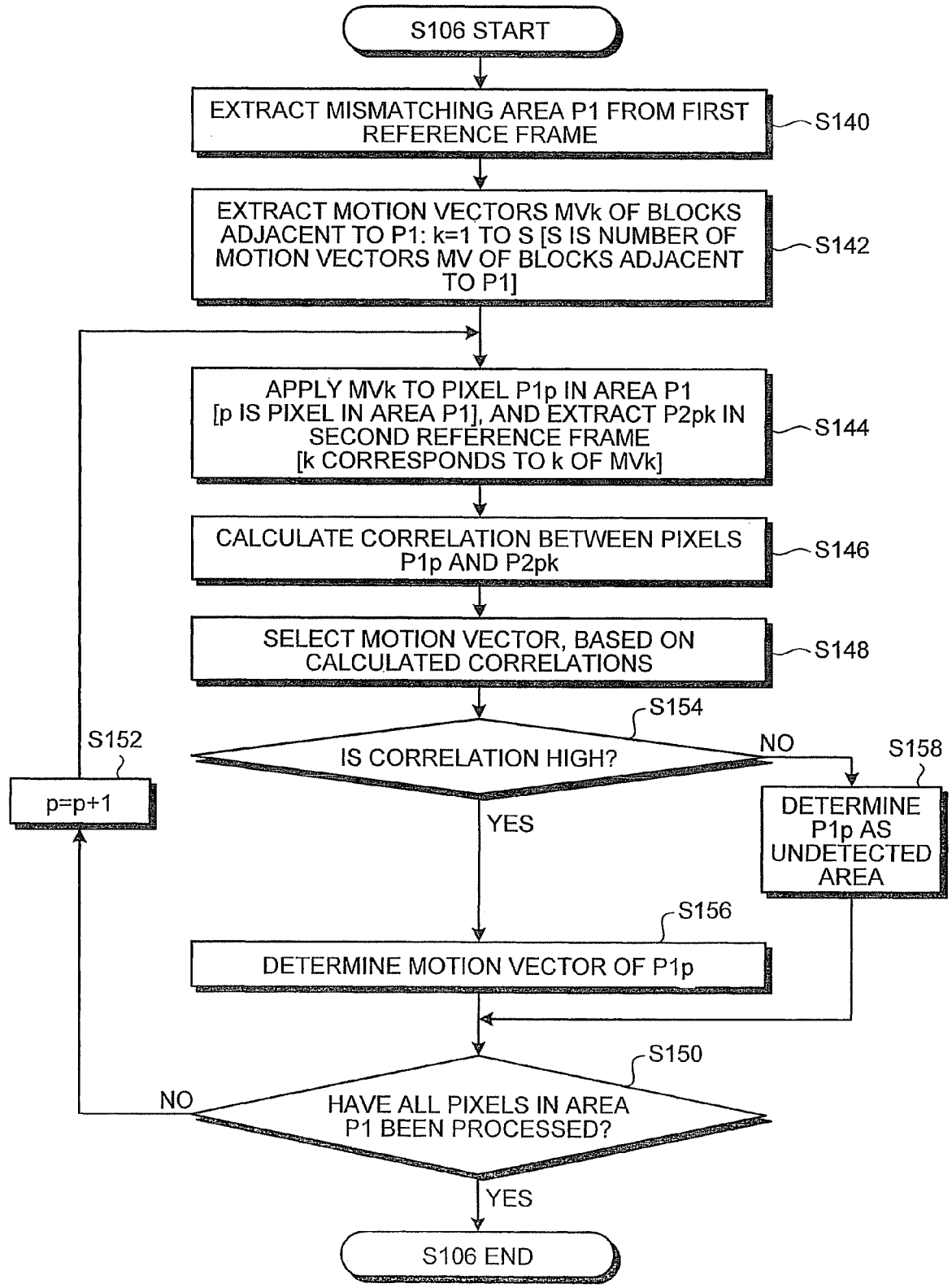
FIG. 22 is a flowchart of detailed processing at mismatching motion-vector assignment included in interpolation frame creation performed by the interpolation-frame creating apparatus according to the second embodiment.

As shown in FIG. 22, at the mismatching motion-vector assignment (step S106) included in interpolation frame creation, an optimal motion vector is calculated (step S148), and then an absolute difference between a pixel P1$p$ in the first reference frame 200 and a pixel P2$pk$ in the second reference frame 300 defined based on the optimal motion vector is compared with a threshold. If the absolute difference is smaller than the threshold, i.e., a correlation is high, the motion vector is determined as a motion vector for the pixel P1$p$ (step S156). In contrast, if the absolute difference is larger than the threshold, i.e., a correlation is low, the motion vector is not used, and the pixel P1$p$ is determined as an undetected area (step S158).

At the motion compensation (step S108) according to the second embodiment, an area in an interpolation frame corresponding to the undetected area is assigned with an average value of luminance values of pixels adjacent to the undetected area in the first reference block by the motion compensating unit 109.

If a mismatching area corresponds to a newly appearing object or an area arising from noise in the frame that includes the mismatching area, any motion vector of the adjacent first reference blocks does not match to a proper motion vector of the mismatching area. Thus, in some cases, any motion vector appropriate to the mismatching area cannot be selected from the motion vectors of the adjacent first reference blocks. In this case, it is not favorable that a motion vector of an adjacent first reference block is assigned to the mismatching area as the motion vector thereof. Therefore, the interpolation-frame creating apparatus 11 does no use a motion vector of an adjacent first reference block in such case. This can reduce erroneous detection of a motion vector. Furthermore, this can prevent the interpolation-frame creating apparatus 11 from creating an inappropriate interpolation frame by using a motion vector detected by error.

The other configurations of and the other processing performed by the interpolation-frame creating apparatus 11 are the same as those of the interpolation-frame creating apparatus 10.

According to a first modification of the second embodiment, the motion compensating unit 109 can assign a median of adjacent pixels in the first reference block to the undetected area instead of the average of the adjacent pixels.

According to a second modification of the second embodiment, the undetected area can be assigned with a motion vector calculated by the motion estimating unit 100 for a first reference block that includes the undetected area by the motion compensating unit 109.

Figure 23:
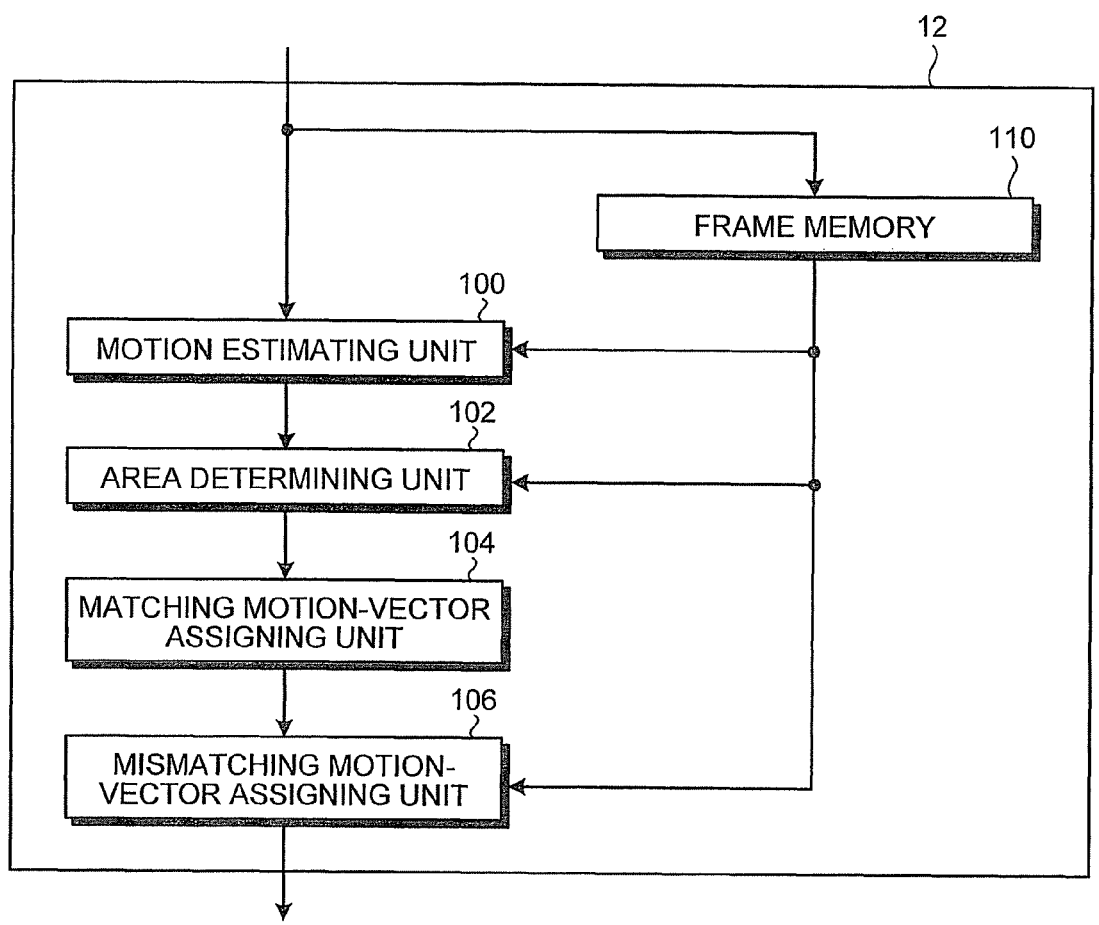
FIG. 23 is a functional block diagram of a motion vector detector according to a third embodiment of the present invention.

As shown in FIG. 23, a motion vector detector 12 according to a third embodiment of the present invention includes the motion estimating unit 100, the area determining unit 102, the matching motion-vector assigning unit 104, the mismatching motion-vector assigning unit 106, and the frame memory 110. A function of each unit is the same as that of each corresponding unit according to the first embodiment. The interpolation-frame creating apparatus 10 according to the fist embodiment creates an interpolation frame based on the motion vectors assigned by the matching motion-vector assigning unit 104 and the mismatching motion-vector assigning unit 106. In contrast, the motion vector detector 12 according to the third embodiment performs processes up to the motion-vector assignment. The motion vector detector 12 can precisely calculate a motion vector per area smaller than a macro-block.

An interpolation-frame creating apparatus 13 according to a fourth embodiment of the present invention divides an interpolation frame into macro-blocks, and estimates motions in the first reference frame 200 and the second reference frame 300 based on the macro-blocks in the interpolation frame.

Thus, the interpolation-frame creating apparatus 13 divides the interpolation frame 400, so that any part of an image cannot be superposed each other on the interpolation frame 400, and the interpolation frame 400 do not happen to include any area in which any part of the image is not created, thereby enabling the interpolation-frame creating apparatus 13 to create a precise interpolation frame.

Figure 24:
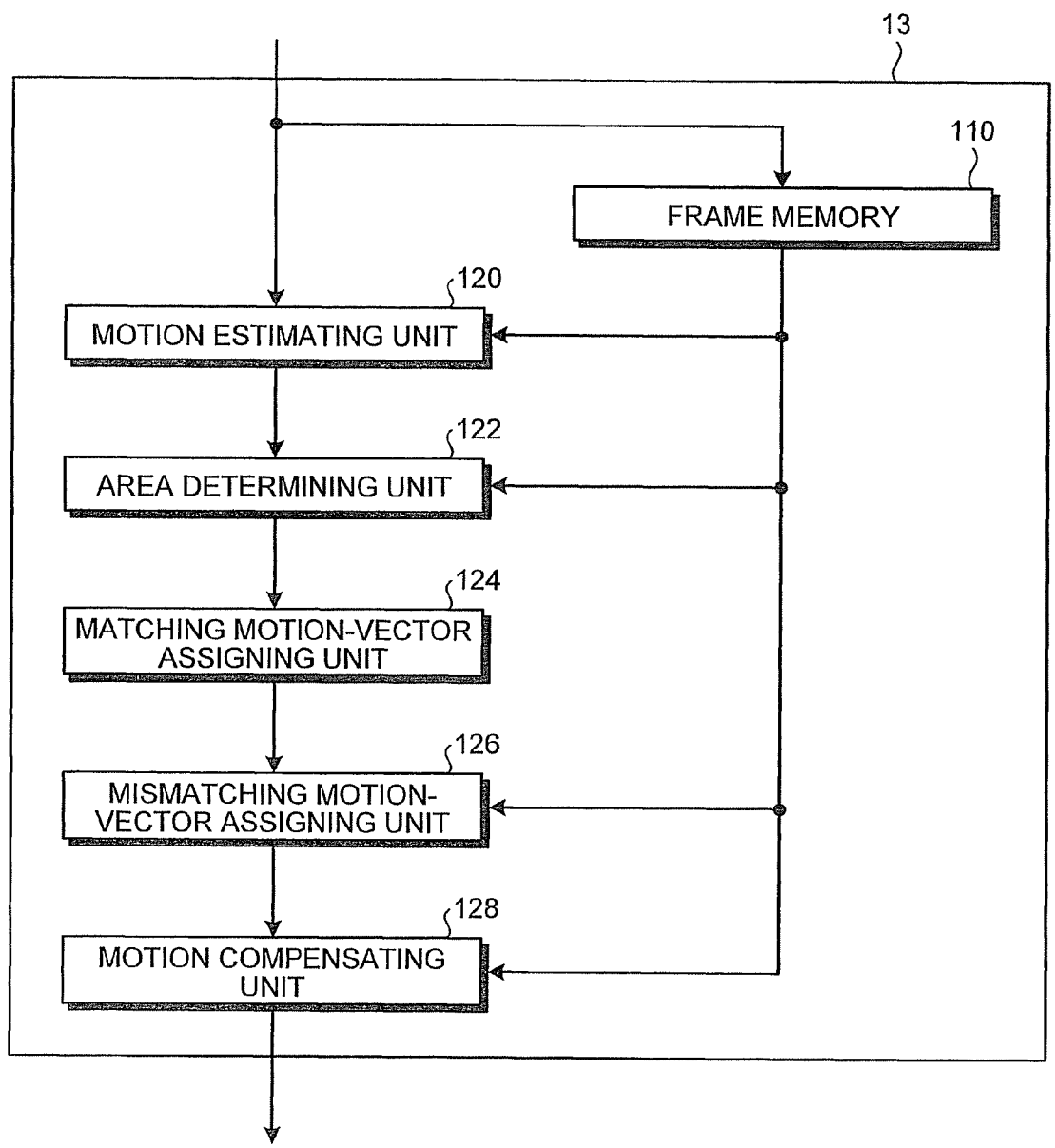
FIG. 24 a functional block diagram of an interpolation-frame creating apparatus according to a fourth embodiment of the present invention.

As shown in FIG. 24, the interpolation-frame creating apparatus 13 includes a motion estimating unit 120, an area determining unit 122, a matching motion-vector assigning unit 124, a mismatching motion-vector assigning unit 126, a motion compensating unit 128, and the frame memory 110, similarly to the interpolation-frame creating apparatus 10.

Figure 25:
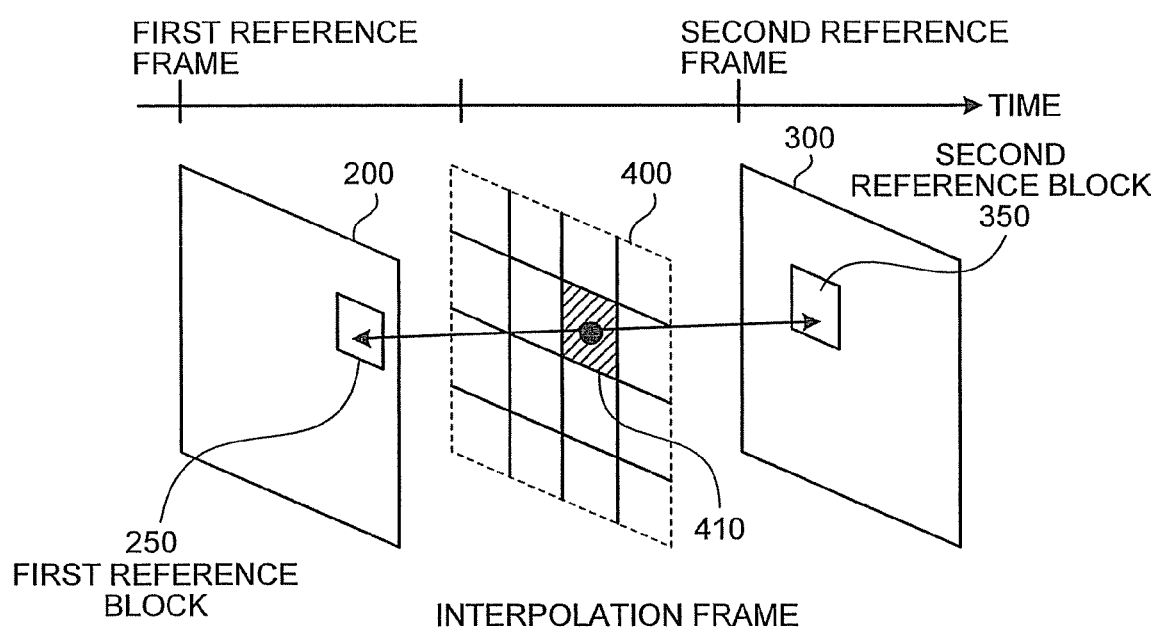
FIG. 25 is a schematic for explaining processing performed by a motion estimating unit in the interpolation-frame creating apparatus according to a fourth embodiment of the present invention.

As shown in FIG. 25, the motion estimating unit 120 divides the interpolation frame 400 into macro-blocks and obtains a plurality of interpolation blocks including an interpolation block 410. The motion estimating unit 120 then estimates motions of a first reference block 250 in the first reference frame 200 and a second reference block 350 in the second reference frame 300 based on the interpolation block 410. Here, both the first reference block 250 and the second reference block 350 have the identical shape and the equal size to the interpolation block 410.

In addition, the area determining unit 122 according to the fourth embodiment determines whether each area in the interpolation frame 400 is a matching area or a mismatching area. The matching motion-vector assigning unit 124 then assigns a motion vector to a matching area in the interpolation frame 400, and the mismatching motion-vector assigning unit 126 assigns a motion vector to a mismatching area in the interpolation frame 400.

Figure 26:
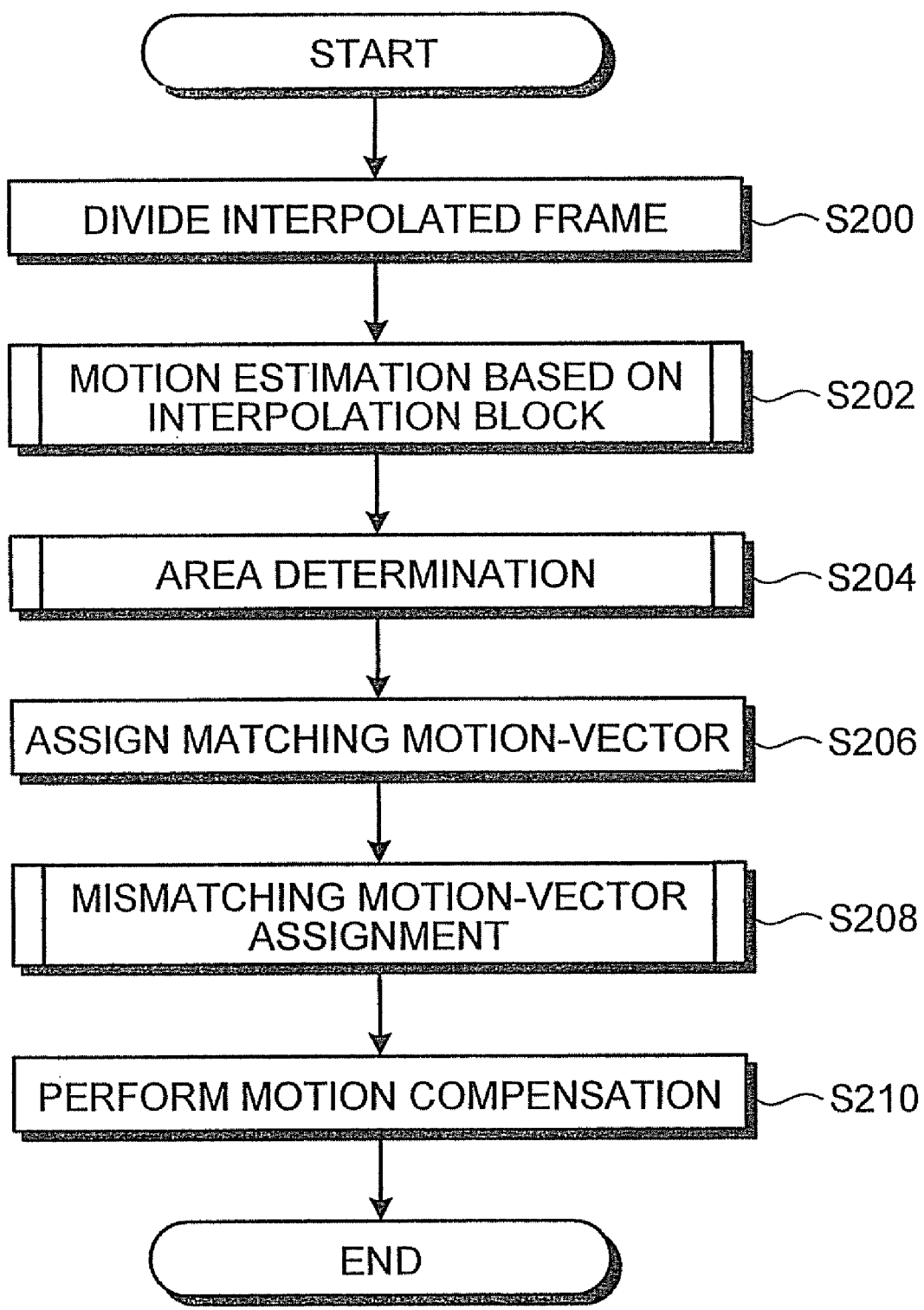
FIG. 26 is a flowchart of processing of interpolation frame creation performed by the interpolation-frame creating apparatus according to the fourth embodiment.

As shown in FIG. 26, first of all at the interpolation frame creation, the motion estimating unit 120 divides an interpolation frame to obtain interpolation blocks (step S200). Next, the motion estimating unit 120 performs motion estimation based on the interpolation blocks (step S202). The area determining unit 122 then performs area determination (step S204).

The matching motion-vector assigning unit 124 then assigns a motion vector calculated by the motion estimating unit 120 to a matching area (step S206). The mismatching motion-vector assigning unit 126 then assigns a motion vector assigned to an adjacent interpolation block to a mismatching area (step S208). The motion compensating unit 128 then performs motion compensation by using the motion vector assigned by the matching motion-vector assigning unit 124 and the motion vector assigned by the mismatching motion-vector assigning unit 106 to assign an image to the interpolation frame (step S210). The interpolating frame creation performed by the interpolation-frame creating apparatus 13 is then completed.

Figure 27:
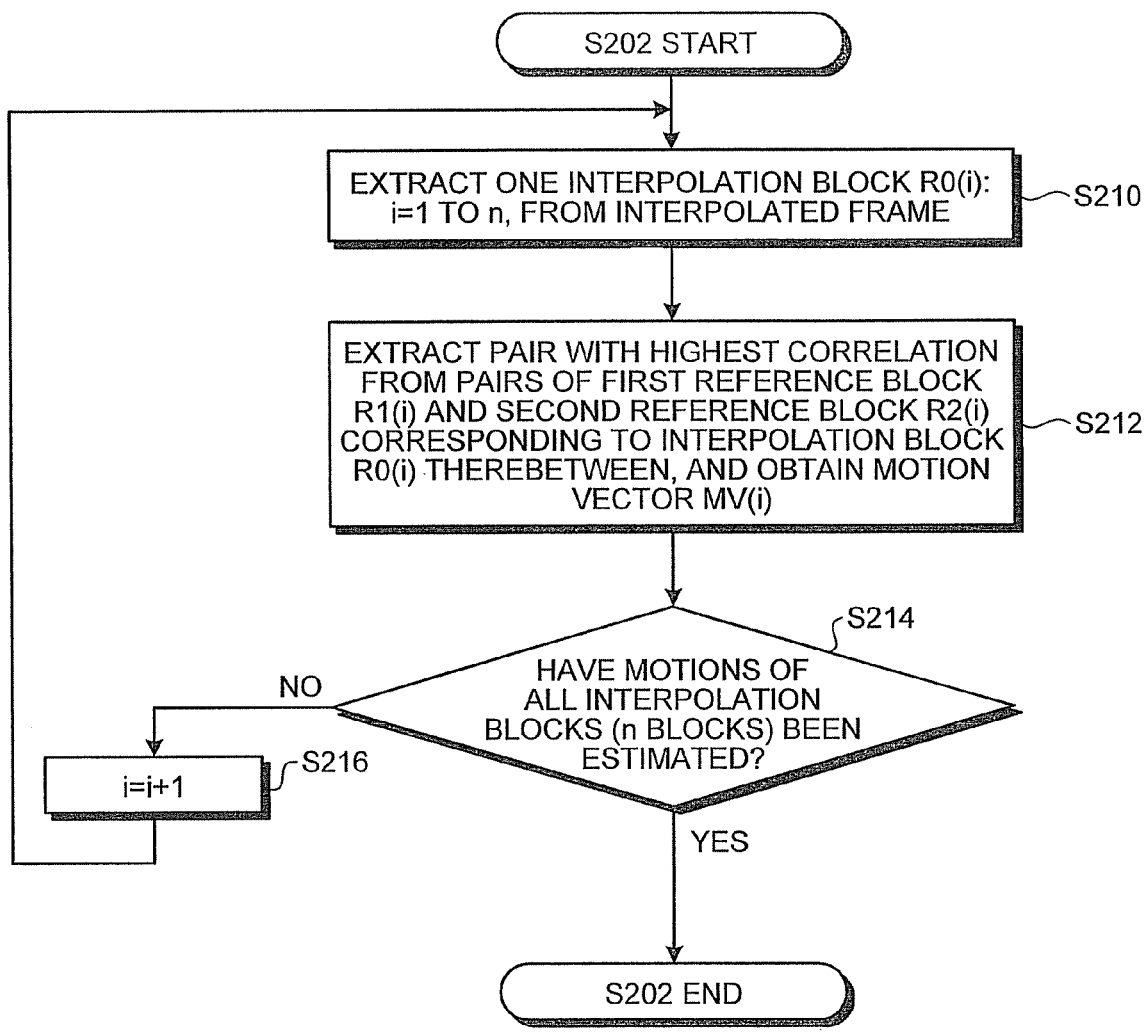
FIG. 27 is a flowchart of detailed processing at motion estimation explained with reference to FIG. 26.

As shown in FIG. 27, first of all at the motion estimation (step S202), the motion estimating unit 120 extracts an interpolation block R0($i$) from the interpolation blocks included in the interpolation frame 400 (step S210). Next, the motion estimating unit 120 extracts a pair with the highest correlation in pairs of a first reference block R1($i$) and a second reference block R2($i$) both of which are specified based on the interpolation block R0($i$) in the middle, and obtains a motion vector MV(i) from extracted pair (step S212).

The motion estimating unit 100 performs the above processing on all of the interpolation blocks (Yes at step S214), and then complete the motion estimation (step S202). If there is any interpolation block that has not been processed yet (No at step S214), the motion estimating unit 100 adds "1" to the value of i (step S216), and then goes back to step S210.

Figure 28:
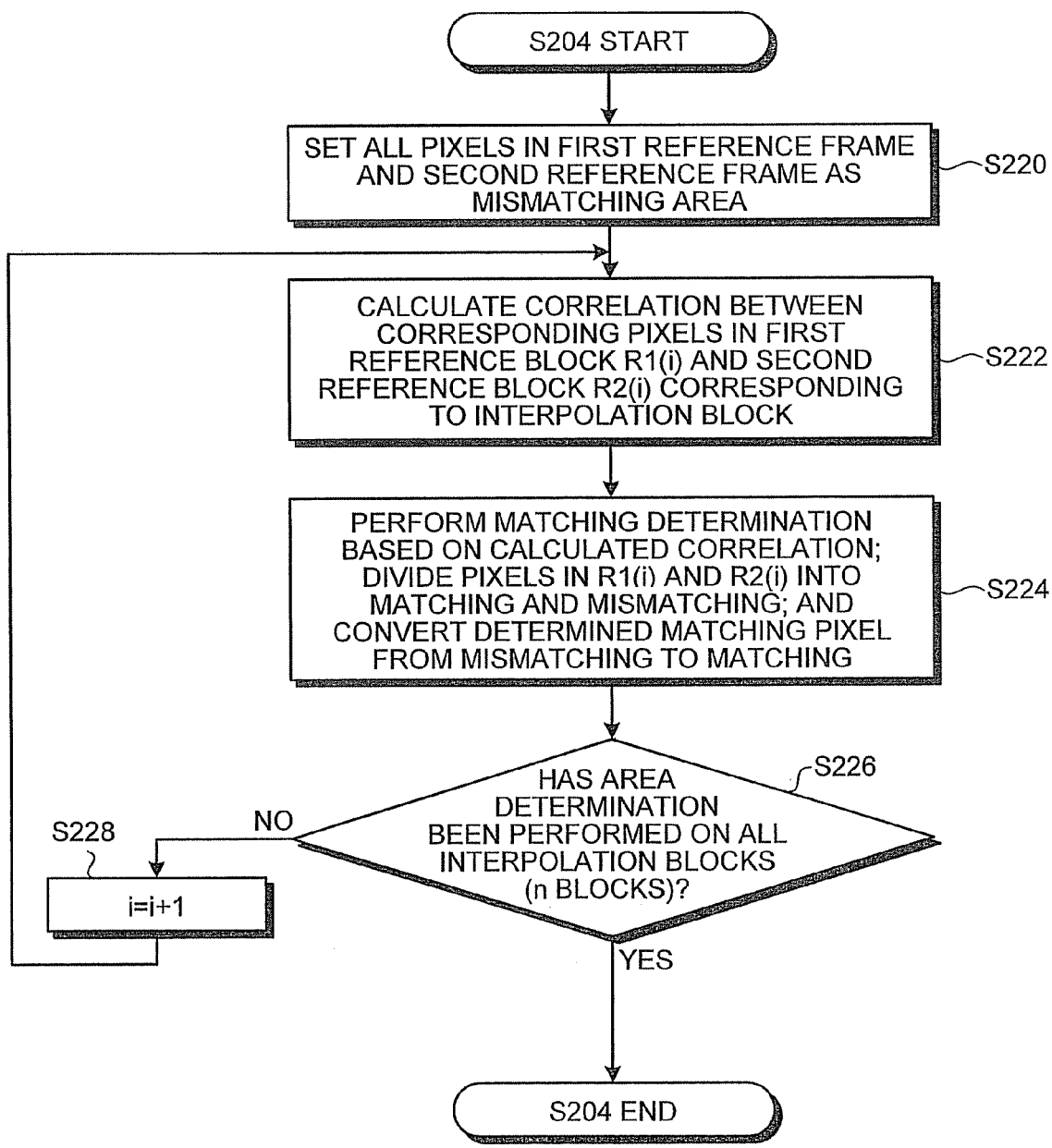
FIG. 28 is a flowchart of detailed processing at area determination explained with reference to FIG. 26.

As shown in FIG. 28, first of all at the area determination (step S204), the area determining unit 122 sets all pixels in the first reference frame and the second reference frame as a mismatching area (step S220). Next, the area determining unit 122 calculates a correlation between every single pixel in a first reference block R1($i$) and its corresponding pixel in a second reference block R2($i$), where the first reference block R1($i$) and the second reference block R2($i$) are both associated with a certain interpolation block R0($i$) (step S222). The area determining unit 122 then determines whether both pixels are matching each other based on calculated correlation, and if the area determining unit 122 determines that the pixels are matching, the pixels are converted from the mismatching area to a matching area (step S224).

If there is any interpolation block that has not been performed with the above processing (No at step S226), the area determining unit 122 adds "1" to the value of i (step S228), and then goes back to step S222. When the area determining unit 122 has performed the processing at steps S222 and S224 on all interpolation blocks (Yes at step S226), the area determination is completed (step S204).

Figure 29:
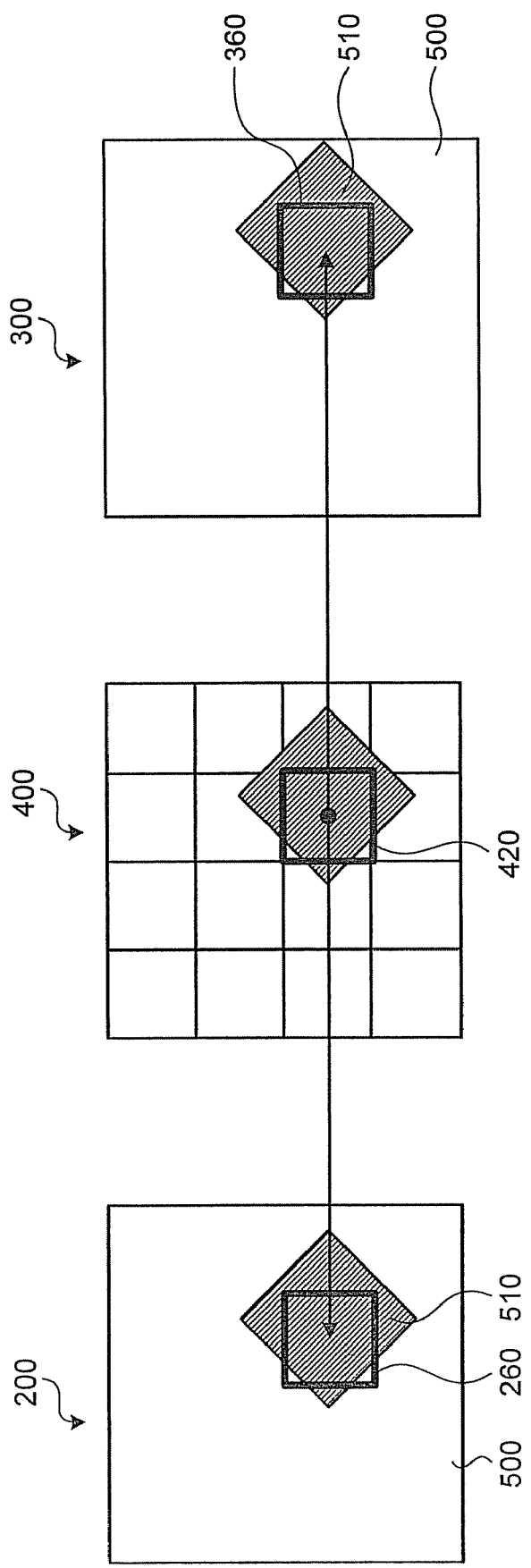
FIG. 29 is a schematic for specifically explaining the area determination in FIG. 28.
Figure 30:
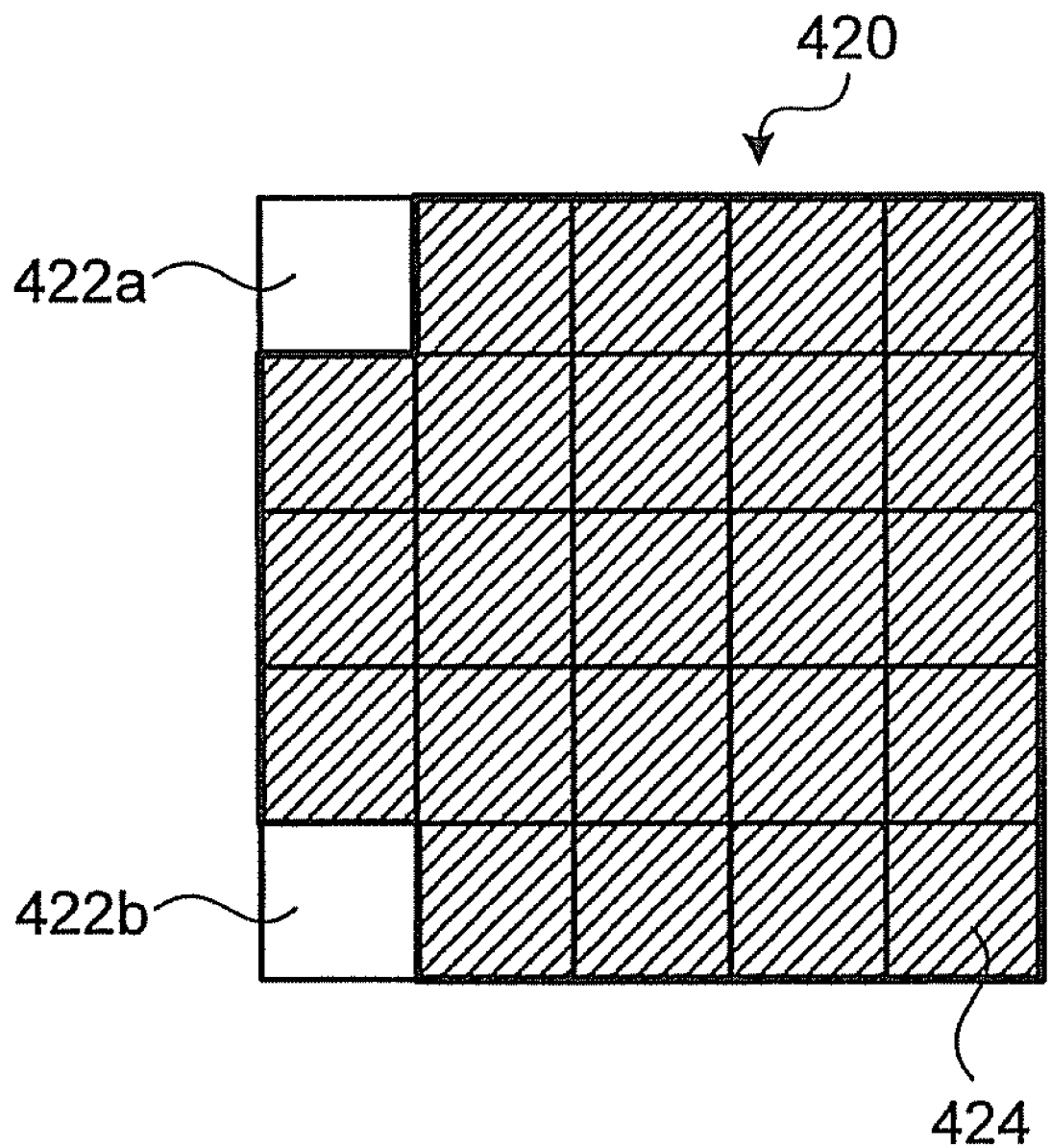
FIG. 30 is a schematic for specifically explaining the area determination in FIG. 28.

As shown in FIG. 29, when the area determination is performed on an interpolation block 420, and a first reference block 260 and a second reference block 360 both of which correspond to the interpolation block 420, an area corresponding to the object 510 becomes a matching area. However, parts of the background 500 included in the first reference block 260 and parts of the background 500 included in the second reference block 360 correspond to different parts in the background 500, so that those parts become mismatching areas. Correspondingly, as shown in FIG. 30, also in the interpolation block 420, an area corresponding to the object 510 becomes a matching area 424, and areas corresponding to the background 500 become mismatching areas 422$a$ and 422$b$.

Figure 31:
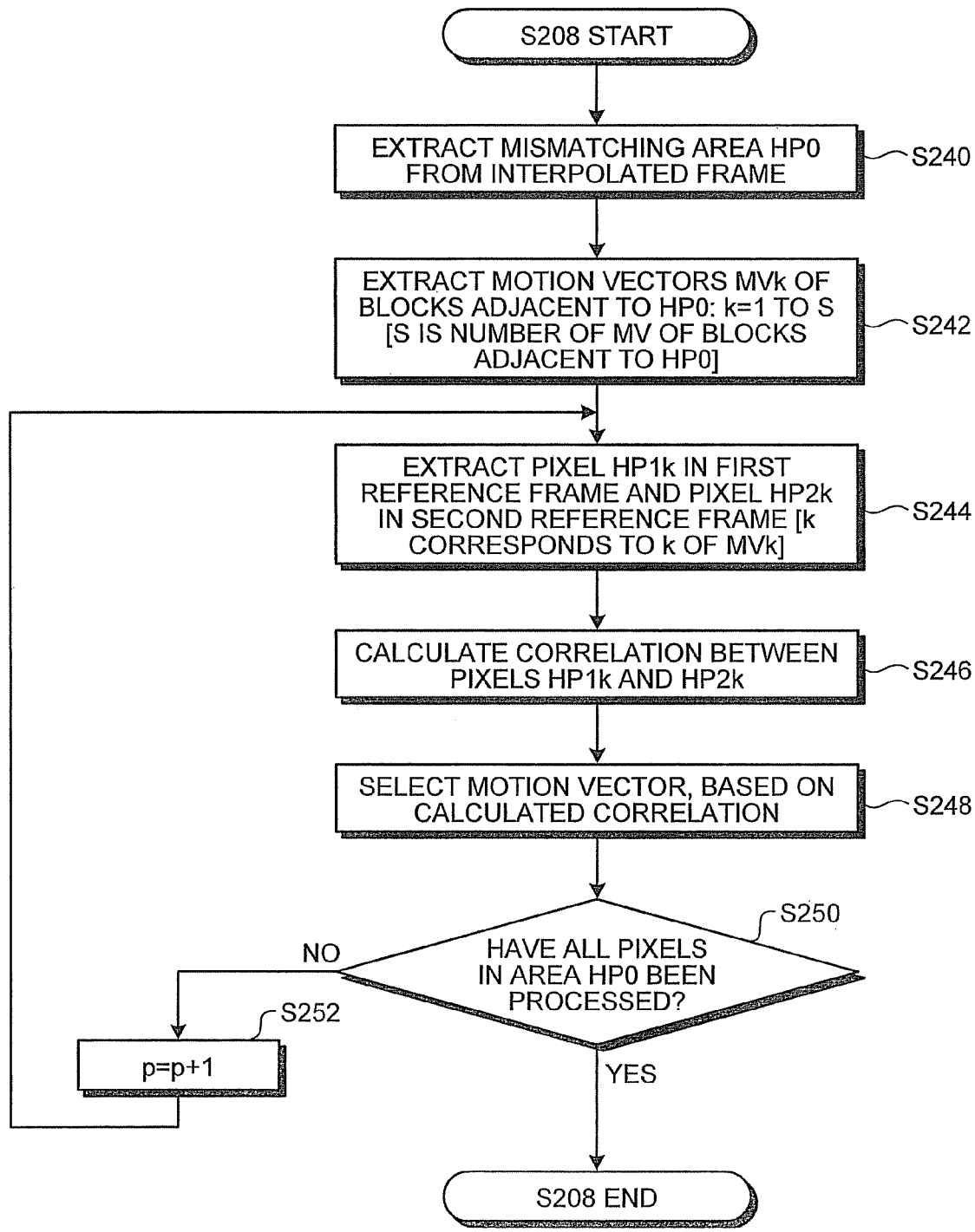
FIG. 31 is a flowchart of detailed processing at mismatching motion-vector assignment in FIG. 26.

As shown in FIG. 31, first of all at the mismatching motion-vector assignment (step S208), the mismatching motion-vector assigning unit 126 extracts a mismatching area HP0 from the interpolation frame 400 (step S240). Next, the mismatching motion-vector assigning unit 126 extracts a motion vector MVk of an interpolation block adjacent to the mismatching area HP0 (k=1 to S, S is the number of motion vectors MV present around the mismatching area HP0) (step S242). Here, all motion vectors of adjacent interpolation blocks are extracted. For example, if there are two motion vectors, the mismatching motion-vector assigning unit 126 extracts the two motion vectors. If all of the adjacent interpolation blocks have the same motion vector, the mismatching motion-vector assigning unit 126 extracts the one motion vector.

Next, the mismatching motion-vector assigning unit 126 applies extracted motion vector MVk to each pixel HP0$p$ in the mismatching area HP0 (p is a pixel in the mismatching area HP0), and then extracts a pixel H1$k$ in the first reference frame 200 and a pixel H2$k$ in the second reference frame 300 (k corresponds to k of the motion vector MVk)(step S244). In other words, the number of extracted pairs of a pixel H1$k$ and a pixel H2$k$ are equal to the number of the extracted motion vectors.

Next, the mismatching motion-vector assigning unit 126 calculates a correlation between the pixel H1$k$ and the pixel H2$k$ (step S246). Specifically, an absolute difference of luminance between the pixel H1$k$ and the pixel H2$k$ is calculated. The mismatching motion-vector assigning unit 126 then selects a motion vector appropriate to the pixel HP0$p$ from the motion vectors MVk based on calculated correlations (step S248). If the extracted motion vectors are plural, the mismatching motion-vector assigning unit 126 selects a motion vector corresponding to the smallest absolute difference in absolute differences each of which is calculated based on each of the motion vectors, i.e., a motion vector that has the highest correlation in the calculated correlations.

When the mismatching motion-vector assigning unit 126 has performed the above processing on all pixels in the mismatching areas (Yes at step S250), the mismatching motion-vector assignment (step S208) is completed. If there is any pixel that has not been performed with the above processing (No at step S250), the mismatching motion-vector assigning unit 126 adds "1" to the value of p (step S252), and then goes back to step S244.

Figure 32:
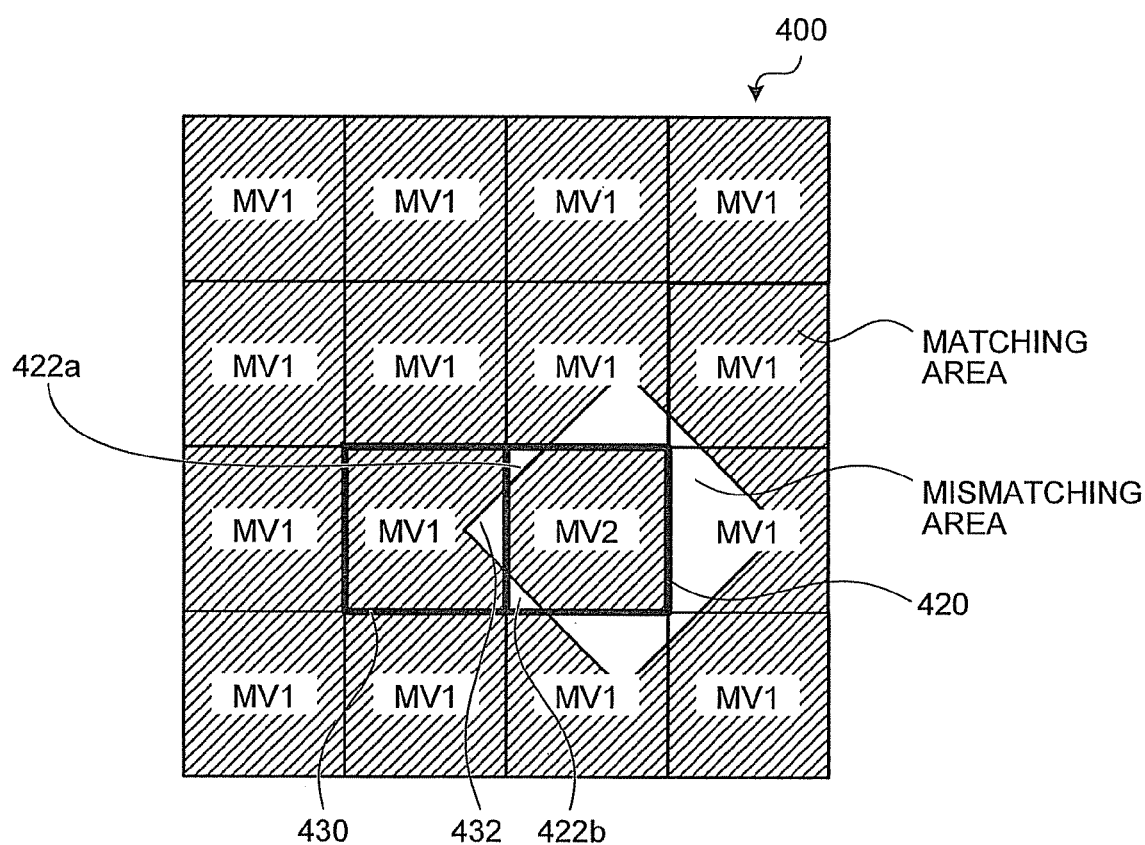
FIG. 32 is a schematic for specifically explaining the mismatching motion-vector assignment in FIG. 31.

In each interpolation block shown in FIG. 32, a motion vector calculated by the motion estimating unit 100 is indicated. Results of the area determination are also presented. For example, the motion vector MV1 for the adjacent interpolation blocks is extracted for the mismatching areas 422$a$ and 422$b$ of an upper left pixel and a lower left pixel in the interpolation block 420.

In this case, any of respective motion vectors of eight adjacent interpolation blocks is MV1. Therefore, the mismatching motion-vector assigning unit 126 determines that the motion vector MV1 is the motion vector for the mismatching areas 422$a$ and 422$b$ in the interpolation block 420. On the other hand, the motion vectors MV1 and MV2 are extracted for a mismatching area 432 of a center right pixel in an interpolation block 430. In this case, the mismatching motion-vector assigning unit 126 determines a correlation with respect to each of the motion vectors, and selects a motion vector that obtains a high correlation. In this example, the motion vector MV2 is selected.

The other configurations of and the other processing performed by the interpolation-frame creating apparatus 13 are the same as those of the interpolation-frame creating apparatus 10.

Figure 33:
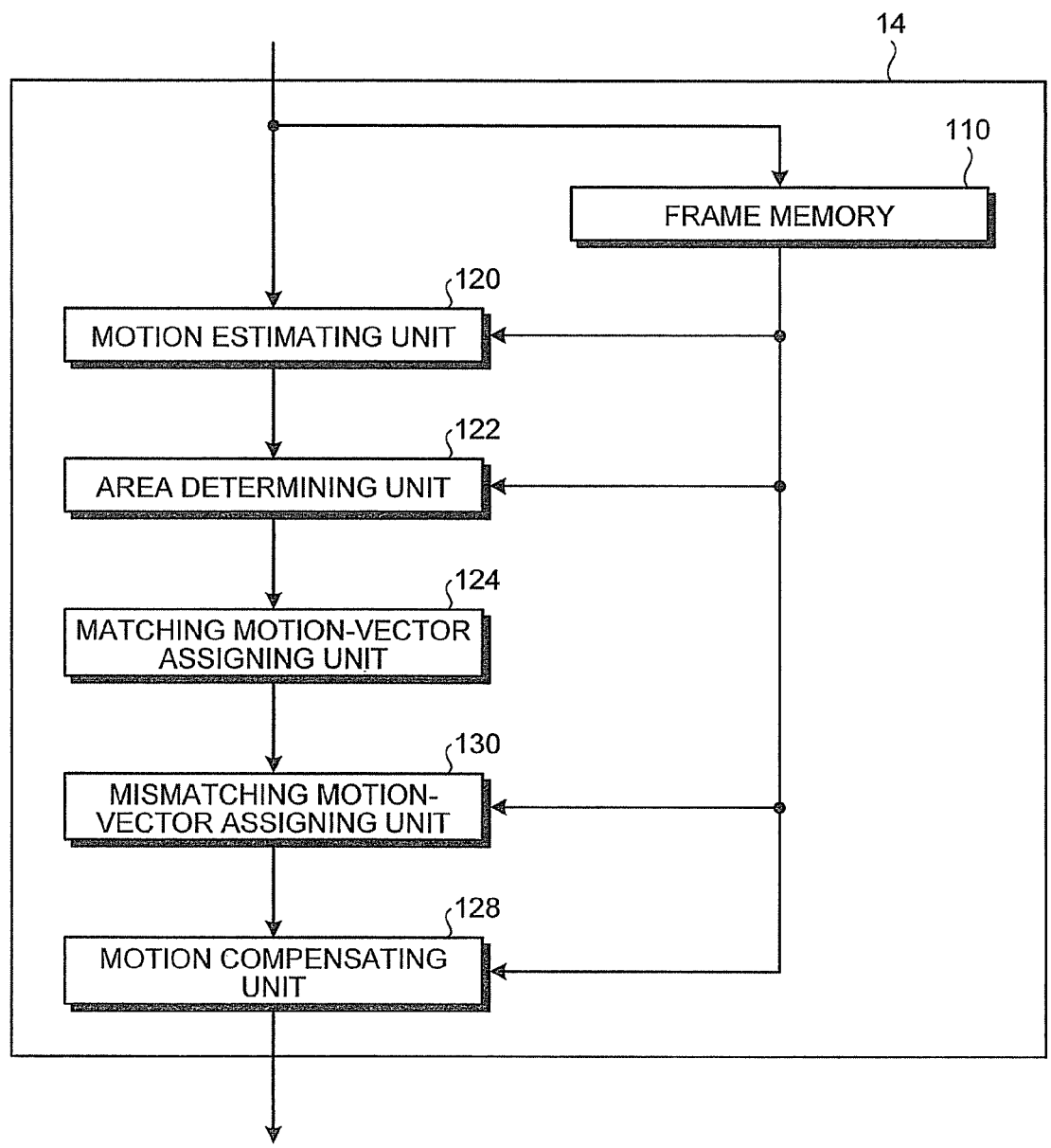
FIG. 33 is a functional block diagram of an interpolation-frame creating apparatus according to a fifth embodiment of the present invention.

As shown in FIG. 33, an interpolation-frame creating apparatus 14 according to a fifth embodiment of the present invention has a functional configuration almost similarly to the interpolation-frame creating apparatus 13. The interpolation-frame creating apparatus 14 estimates motions in the first reference frame 200 and the second reference frame 300 based on the interpolation frame 400. In addition, the interpolation-frame creating apparatus 14 determines a motion vector to be assigned to a mismatching area by using other frames as well as the first reference frame 200 and the second reference frame 300.

In general, a moving image sometimes includes a so-called dark area in which a motion vector cannot be extracted from two frames. The interpolation-frame creating apparatus 14 can assign an appropriate image to such dark area by using a plurality of frames.

Figure 34:
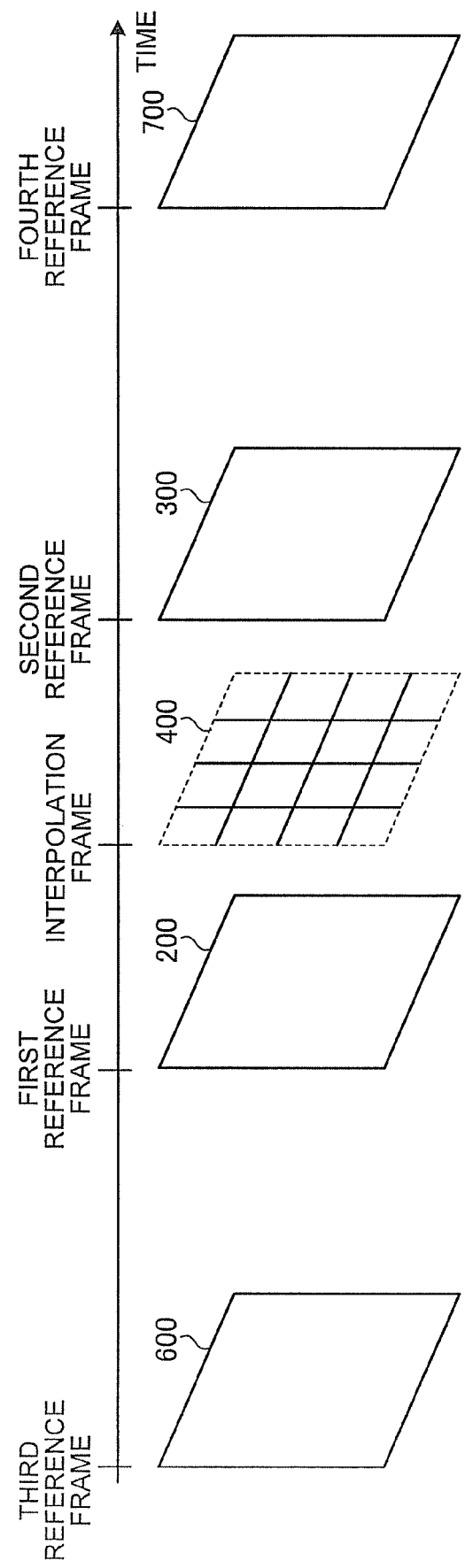
FIG. 34 is a schematic for explaining reference frames subjected to the interpolation-frame creating apparatus according to the fifth embodiment.

As shown in FIG. 34, the interpolation-frame creating apparatus 14 uses a third reference frame 600 and a fourth reference frame 700, in addition to the first reference frame 200, the second reference frame 300, and the interpolation frame 400 therebetween. The third reference frame 600 is a frame temporally in advance of the first reference frame 200, and the fourth reference frame 700 is a frame temporally behind of the second reference frame 300.

Figure 35:
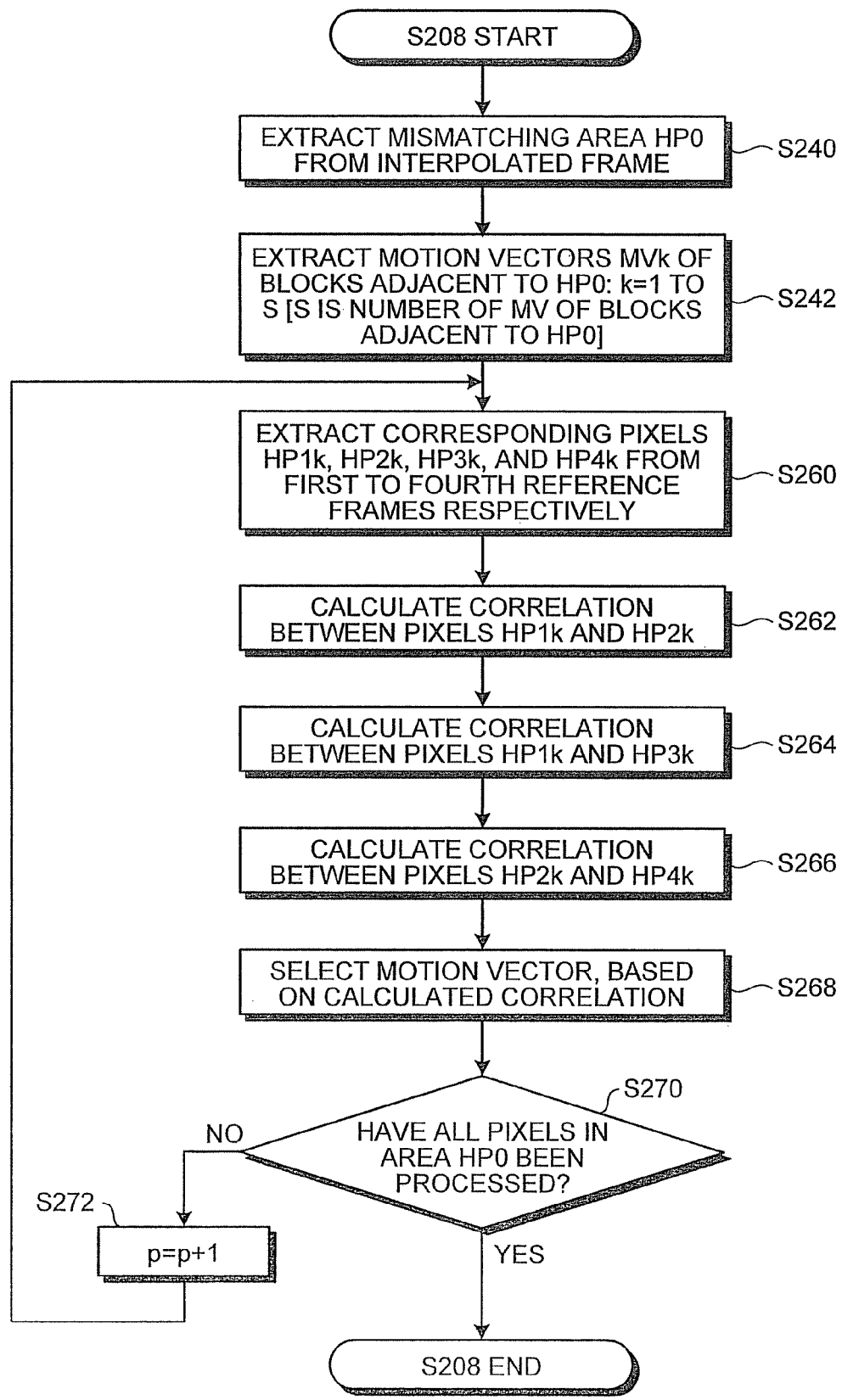
FIG. 35 is a flowchart of detailed processing at mismatching motion-vector assignment in interpolation frame creation performed by the interpolation-frame creating apparatus according to the fifth embodiment.

As shown in FIG. 35, at mismatching motion-vector assignment (step S208), a mismatching motion-vector assigning unit 130 extracts respective motion vectors of interpolation blocks adjacent to a mismatching area HP0 (step S242), and then extracts pixels HP1$k$, HP2$k$, HP3$k$, and HP4$k$ which correspond to the first to the fourth reference frames 200, 300, 600, and 700 respectively based on each of extracted motion vectors MV$k$ (step S260).

Next, the mismatching motion-vector assigning unit 130 calculates a correlation between a pixel HP1$k$ in the first reference frame 200 and a pixel HP2$k$ in the second reference frame 300 (step S262). The mismatching motion-vector assigning unit 130 then calculates a correlation between the pixel HP1$k$ in the first reference frame 200 and a pixel HP3$k$ in the third reference frame 600 (step S264). The mismatching motion-vector assigning unit 130 then calculates a correlation between the pixel HP2$k$ in the second reference frame 300 and a pixel HP4$k$ in the fourth reference frame 700 (step S266).

Based on calculated correlations, the mismatching motion-vector assigning unit 130 selects a motion vector corresponding to a combination of pixels that have the highest correlation in the calculated correlations as a motion vector to be assigned to a pixel HP0$p$ (step S268). When the mismatching motion-vector assigning unit 130 performed the above processing on all pixels in the mismatching area HP0 (Yes at step S270), the mismatching motion-vector assignment is completed (step S208).

Figure 36:
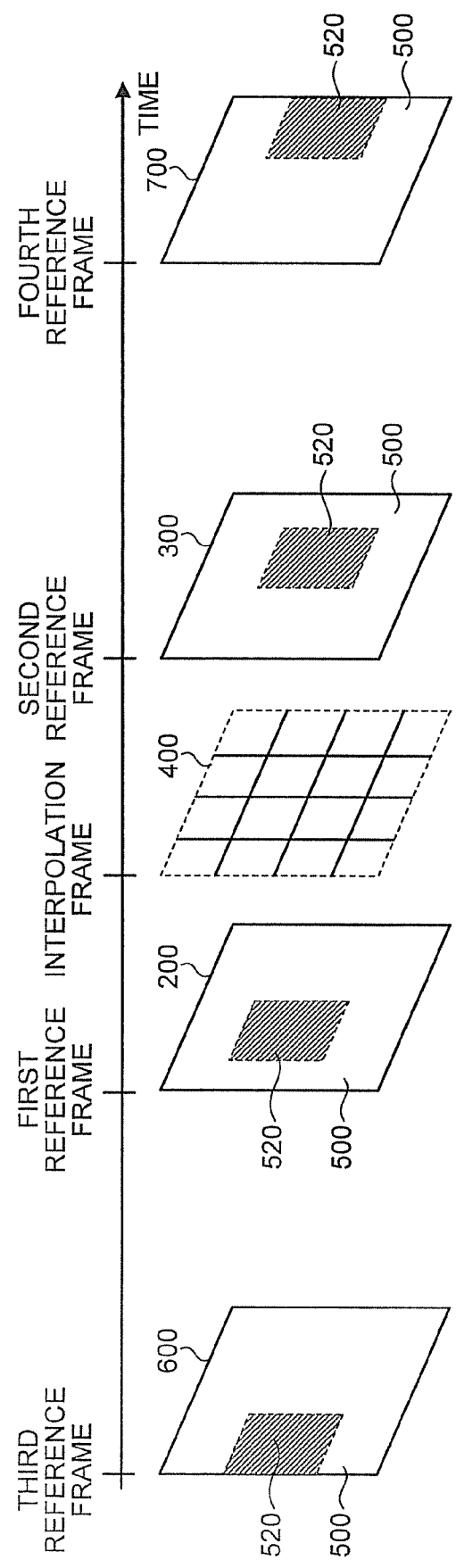
FIG. 36 is a schematic for explaining a moving image in which an object moves.
Figure 37:
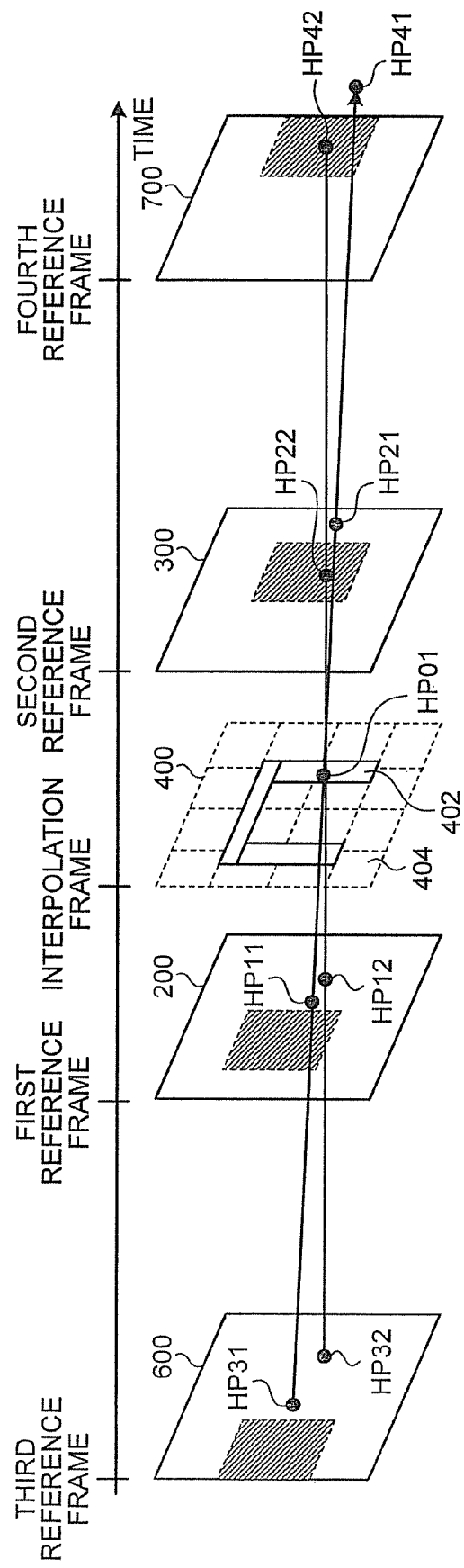
FIG. 37 is a schematic for explaining a result of area determination performed on the moving image shown in FIG. 36.

The interpolation frame 400 shown in FIG. 36 is divided into a matching area 402 and a mismatching area 404 as shown in FIG. 37. In motion vector calculations for a pixel HP01, a calculated correlation between pixels HP32 and HP12 is the highest. Therefore, a motion vector corresponding to the pixels HP32 and HP12 is selected for the pixel HP01.

The other configurations of and the other processing performed by the interpolation-frame creating apparatus 14 are the same as those of the interpolation-frame creating apparatus 13.

Figure 38:
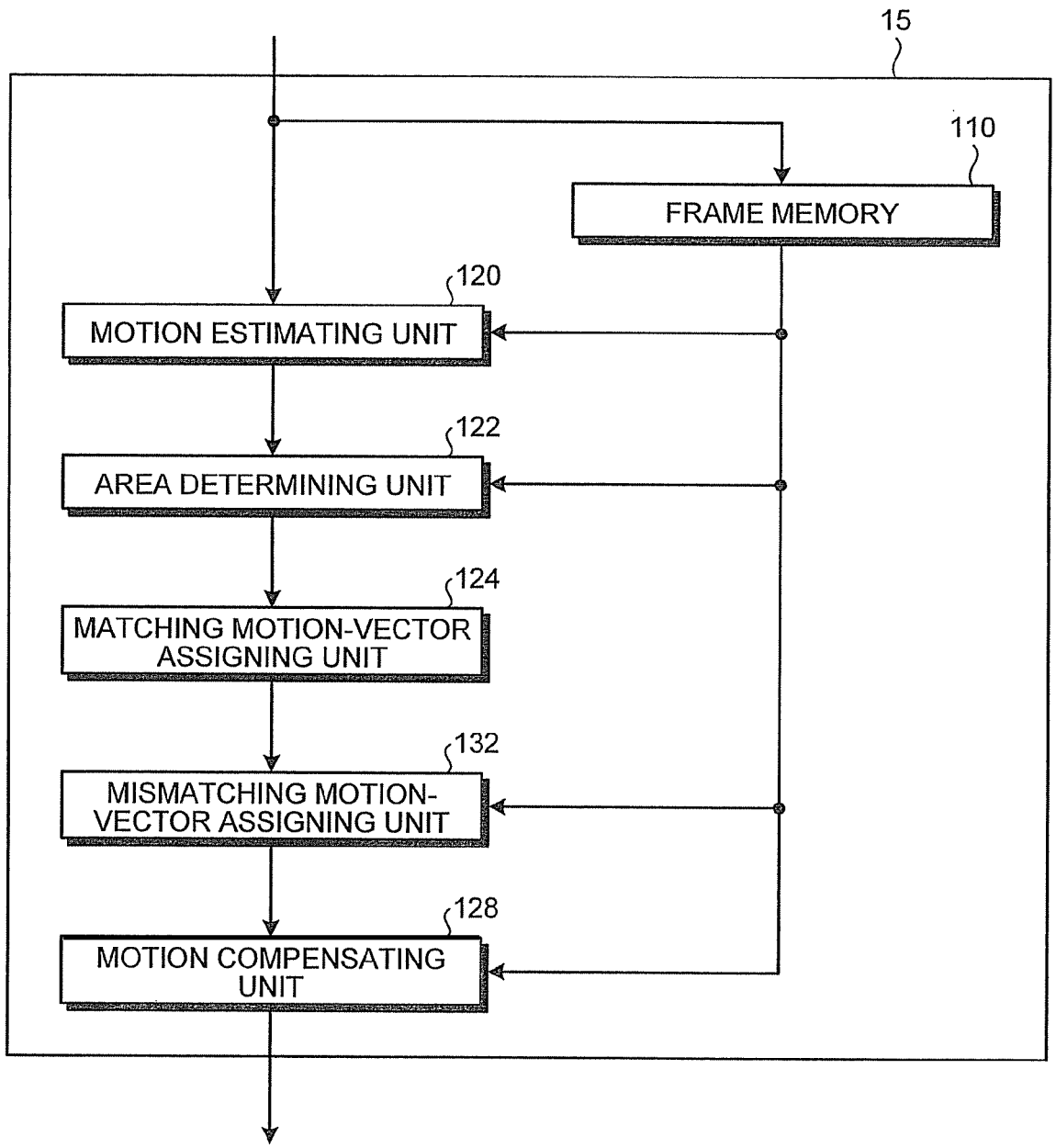
FIG. 38 is a functional block diagram of an interpolation-frame creating apparatus according to a sixth embodiment of the present invention.
Figure 39:
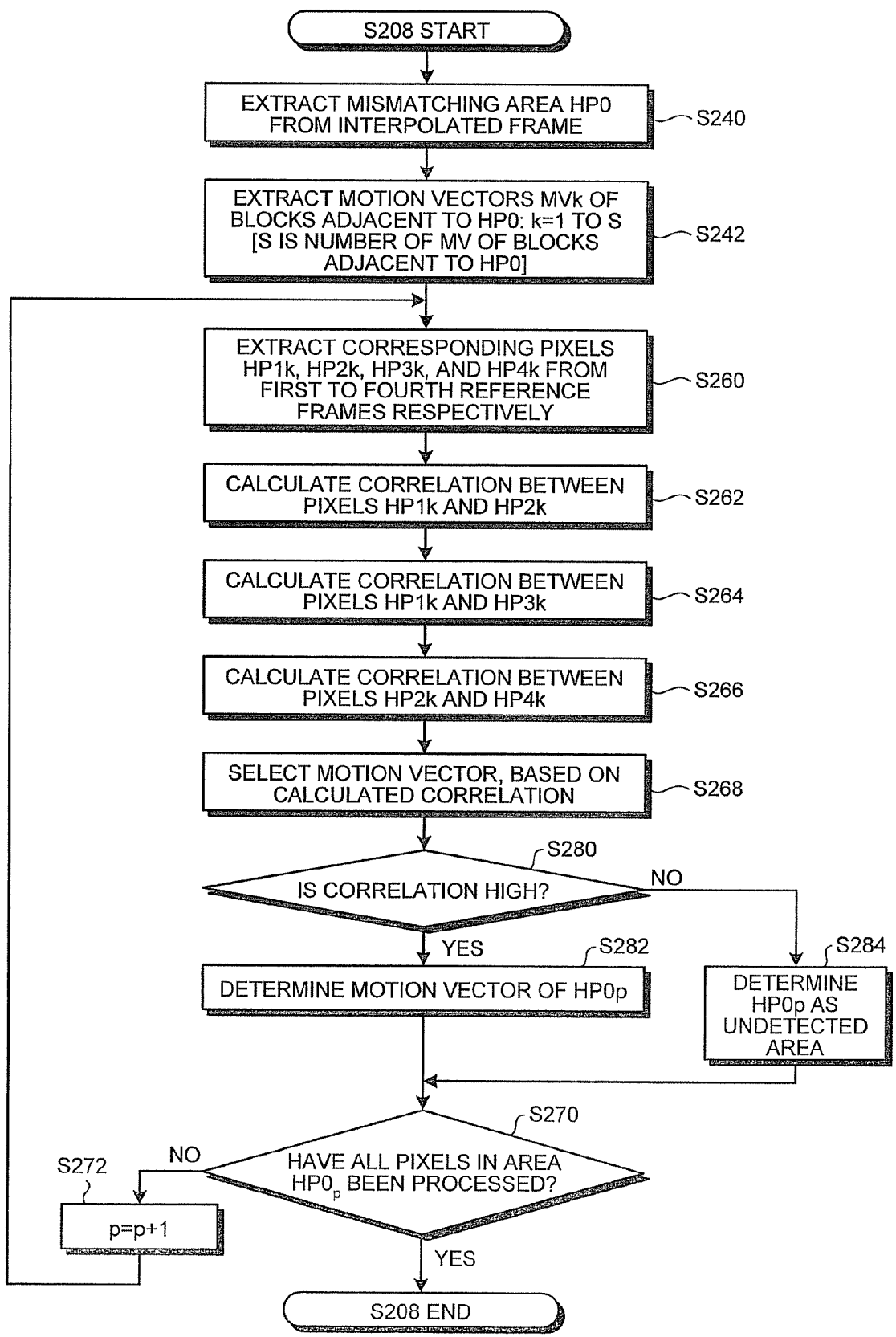
FIG. 39 is a flowchart of detailed processing at mismatching motion-vector assignment performed by the interpolation-frame creating apparatus according to a sixth embodiment of the present invention.

As shown in FIG. 38, a functional configuration of an interpolation-frame creating apparatus 15 according to a sixth embodiment of the present invention is similar to that of the interpolation-frame creating apparatuses 13 and 14. As shown in FIG. 39, at the mismatching motion-vector assignment (step S208), in the interpolation-frame creating apparatus 15, a mismatching motion-vector assigning unit 132 selects a motion vector based on the calculated correlations between pixels in respective frames (step S268), and then compares an absolute difference between two pixels specified by selected motion vector with a threshold. If the absolute difference is smaller than the threshold, i.e., a correlation is high (Yes at step S280), the mismatching motion-vector assigning unit 132 determines the motion vector as a motion vector for a pixel HP0$p$ (step S282). In contrast, if the absolute difference is larger than the threshold, i.e., a correlation is low (No at step S280), the motion vector is not used, and the pixel HP0$p$ is determined as an undetected area (step S284).

For an area in an interpolation frame corresponding to an undetected area, a motion vector is determined via motion estimation by using a mismatching area at the motion compensation (step S210). As shown in FIG. 40, for example, the motion estimation is performed by using a pixel HP02 in a mismatching area in the interpolation frame 400, a mismatching area in the first reference frame 200, and the third reference frame 600. Additionally, the motion estimation is performed by using the pixel HP02, a mismatching area in the second reference frame 300, and the fourth reference frame 700. Based on results of the motion estimation, a motion vector is determined.

Thus, due to a limitation under which only low correlation areas in the first reference frame and the second reference frame is used for the motion estimation, areas subjected to processing can be limited, thereby improving efficiency of the processing. Furthermore, this can improve precision of the motion estimation.

The other configurations of and the other processing performed by the interpolation-frame creating apparatus 15 are the same as those of the interpolation-frame creating apparatuses 13 and 14.

According to a modification of the sixth embodiment, the mismatching motion-vector assignment (step S208) in the fourth embodiment can be combined with that in the sixth embodiment. Specifically, a motion vector is selected by using the first reference frame and the second reference frame, similarly to the mismatching motion-vector assignment (step S208) as explained in the fourth embodiment. If a correlation associated with the motion vector is low, another motion vector is selected additionally based on the third reference frame and the fourth reference frame similarly to the mismatching motion-vector assignment (step S208) as explained in the sixth embodiment. This can improve precision of vector detection, and furthermore, create a precise interpolation frame.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus that interpolates an interpolation frame between a first reference frame and a second reference frame, the apparatus comprising:
   a motion vector detecting unit that detects a primary motion vector of each interpolation block in the interpolation frame by referring to the first reference frame and the second reference frame;
   an area detecting unit that detects a first matching area in a first reference block in the first reference frame, a second matching area in a second reference block in the second reference frame, a first mismatching area in the first reference block and a second mismatching area in the second reference block, wherein the both the first matching area and the second matching area are matching and corresponding to each other, the both the first mismatching area and the second mismatching area are mismatching and corresponding to each other, both the first reference block and the second reference block have equal size and identical shape to the interpolation block, and each of the first reference block and the second reference block is specified based on the primary motion vector of the interpolation block;

a first assigning unit that assigns the primary motion vector of the each interpolation block to an interpolation matching area in the each interpolation block, wherein the interpolation matching area corresponds to the first matching area and the second matching area;

a second assigning unit that assigns a secondary motion vector to be assigned to an interpolation mismatching area in the each interpolation block based on surrounding interpolation blocks around the interpolation mismatching area, wherein the interpolation mismatching area corresponds to the first mismatching area and the second mismatching area, the first mismatching area and the second mismatching area being determined as mismatching each other by the area detecting unit; and a motion compensating unit that assigns an image onto the interpolation frame based on all of at least one motion vector of
  the primary motion vector assigned to the interpolation matching area by the first assigning unit, and
  the secondary motion vector settled for the interpolation mismatching area by the second assigning unit.

2. The apparatus according to claim 1, wherein the second assigning unit assigns the secondary motion vector from at least one primary motion vector of the surrounding interpolation blocks around the interpolation mismatching area.

3. The apparatus according to claim 2, wherein when there are a plurality of primary motion vectors of the surrounding interpolation blocks around the interpolation mismatching area, the second assigning unit assigns the secondary motion vector from the plurality of primary motion vectors based on a correlation between an area in the first reference block and an area in the second reference block, each area being specified based on the interpolation mismatching area and each of the plurality of primary motion vectors.

4. The apparatus according to claim 3, wherein when there are a plurality of primary motion vectors of the surrounding interpolation blocks around the interpolation mismatching area, the second assigning unit assigns the secondary motion vector from the plurality of primary motion vectors based on a correlation between an area in the first reference block, an area in the second reference block, and an area in a third reference block in a third reference frame, each area being specified based on the interpolation mismatching area and each of the plurality of primary motion vectors.

5. The apparatus according to claim 4, wherein when there are a plurality of primary motion vectors of the surrounding interpolation blocks around the interpolation mismatching area, the second assigning unit assigns the secondary motion vector from the plurality of primary motion vectors based on a correlation between an area in the first mismatching area, an area in the second mismatching area, and an area in the third reference block, each area being specified based on the interpolation mismatching area and each of the plurality of primary motion vectors.

6. The apparatus according to claim 1, wherein when a correlation between the first mismatching area and the second mismatching area is higher than a threshold, the second assigning unit assigns the secondary motion vector based on the surrounding interpolation blocks around the interpolation mismatching area.

7. The apparatus according to claim 6, wherein when there are a plurality of primary motion vectors of the surrounding interpolation blocks around the interpolation mismatching area, and when the first mismatching area and the second mismatching area have a lower correlation than a threshold, the second assigning unit assigns the secondary motion vector from the plurality of primary motion vectors based on a correlation between an area in the first reference block, an area in the second reference block, and an area in a third reference block in a third reference frame, each area being specified based on the interpolation mismatching area and each of the plurality of primary motion vectors.

8. The apparatus according to claim 1, wherein when number of pixels included in the interpolation mismatching area is less than a threshold, the interpolation mismatching area is converted to an interpolation matching area, and converted interpolation matching area is assigned with the primary motion vector of the interpolation block.

* * * * *